(12) United States Patent  
O'Loughlin et al.

(10) Patent No.: US 7,163,230 B2
(45) Date of Patent: Jan. 16, 2007

(54) INFLATABLE SIDE CURTAIN WITH FILL TUBE

(75) Inventors: John P. O'Loughlin, Gilbert, AZ (US); Halley O. Stevens, Mesa, AZ (US); Kenneth K. Gudewich, Gilbert, AZ (US); David G. Magoteaux, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 77 days.

(21) Appl. No.: 09/840,196

(22) Filed: Apr. 23, 2001

(65) Prior Publication Data

US 2001/0024030 A1 Sep. 27, 2001

Related U.S. Application Data

(63) Continuation-in-part of application No. 09/502,838, filed on Feb. 11, 2000, now abandoned.

(51) Int. Cl.
*B60R 21/22* (2006.01)

(52) U.S. Cl. .................................. 280/730.2; 280/742

(58) Field of Classification Search ............ 280/730.2, 280/736, 741, 742, 728.1
See application file for complete search history.

(56) References Cited

U.S. PATENT DOCUMENTS

| | | | | |
|---|---|---|---|---|
| 3,807,755 A | * | 4/1974 | Mason, Jr. ..................... 222/3 |
| 5,433,476 A | * | 7/1995 | Materna et al. ............. 280/736 |
| 5,441,303 A | | 8/1995 | Rozanski ..................... 280/738 |
| 5,551,723 A | * | 9/1996 | Mahon et al. .................. 222/3 |
| 5,551,725 A | | 9/1996 | Ludwig ........................ 280/737 |
| 5,566,976 A | | 10/1996 | Cuevas ........................ 280/737 |
| 5,772,238 A | * | 6/1998 | Breed et al. ............. 280/728.2 |
| 5,788,270 A | | 8/1998 | Haland et al. ............... 280/729 |
| 5,806,883 A | | 9/1998 | Cuevas ........................ 280/751 |
| 5,820,162 A | * | 10/1998 | Fink ........................... 280/742 |
| 5,921,575 A | | 7/1999 | Kretschmer et al. ..... 280/728.2 |
| 5,924,723 A | | 7/1999 | Brantman et al. ....... 280/730.2 |

(Continued)

FOREIGN PATENT DOCUMENTS

DE  19627181  7/1996

(Continued)

OTHER PUBLICATIONS

A copy of a Research Disclosure dated Dec. 1999 entitled Air Bag Fabric for Use With Cold Gas Inflator.

*Primary Examiner*—Lesley D. Morris
*Assistant Examiner*—L. Lum
(74) *Attorney, Agent, or Firm*—Tarolli, Sundheim, Covell & Tummino LLP

(57) ABSTRACT

Apparatus (10) for helping to protect an occupant of a vehicle includes an inflatable vehicle occupant protection device (14) inflatable between the vehicle side structure (16) and a vehicle occupant. The device (14) defines an inflatable volume (58) that includes a forward portion (64) and a rearward portion (66). An inflation fluid source (24) is in fluid communication with a fill tube (22) and provides helium inflation fluid for inflating the device (14). The fill tube (22) includes outlet apertures (100) that direct the inflation fluid into the inflatable volume to inflate the device (14) initially to a first pressure and maintain the device inflated above a second pressure for a predetermined time. The inflation fluid directed into the inflatable volume (58) has a temperature and a pressure that are generally the same in the forward and rearward portions (64 and 66) during initial inflation of the device. The temperature is about equal to an ambient temperature in which the inflatable vehicle occupant protection device is inflated for at least 95% of the predetermined time.

57 Claims, 12 Drawing Sheets

U.S. PATENT DOCUMENTS

| | | | |
|---|---|---|---|
| 5,941,562 A * | 8/1999 | Rink et al. | 280/737 |
| 6,010,149 A | 1/2000 | Riedel et al. | 280/730.2 |
| 6,022,044 A | 2/2000 | Cherry | 280/730.2 |
| 6,042,141 A * | 3/2000 | Welch et al. | 280/729 |
| 6,056,316 A | 5/2000 | Yamaji et al. | 280/730.2 |
| 6,062,598 A | 5/2000 | Faigle | 280/736 |
| 6,073,961 A | 6/2000 | Bailey et al. | 280/730.2 |
| 6,079,732 A | 6/2000 | Nakajima et al. | 280/728.2 |
| 6,098,548 A * | 8/2000 | Rink et al. | 102/531 |
| 6,099,029 A | 8/2000 | Haland et al. | 280/729 |
| 6,102,435 A | 8/2000 | Wallner et al. | 280/730.2 |
| 6,106,006 A | 8/2000 | Bowers et al. | 280/730.2 |
| 6,106,007 A | 8/2000 | Kretschmer et al. | 280/730.2 |
| 6,135,492 A | 10/2000 | Zimmerbeutel et al. | 280/730.2 |
| 6,142,508 A * | 11/2000 | Lewis | 280/730.2 |
| 6,155,600 A * | 12/2000 | Reynolds et al. | 280/741 |
| 6,164,688 A * | 12/2000 | Einsiedel et al. | 280/730.2 |
| 6,176,518 B1 * | 1/2001 | Faigle | 280/736 |
| 6,213,503 B1 * | 4/2001 | Zimbrich et al. | 280/736 |
| 6,221,186 B1 * | 4/2001 | Rink et al. | 149/1 |
| 6,227,562 B1 | 5/2001 | Shirk et al. | 280/730.2 |
| 6,231,078 B1 * | 5/2001 | Kokeguchi | 280/736 |
| 6,237,941 B1 * | 5/2001 | Bailey et al. | 280/729 |
| 6,296,274 B1 * | 10/2001 | Stevens et al. | 102/530 |
| 6,299,199 B1 * | 10/2001 | Bowers et al. | 280/730.2 |
| 6,325,409 B1 | 12/2001 | Fischer | 280/730.2 |
| 6,412,811 B1 | 7/2002 | Campbell et al. | 280/730.2 |
| 6,455,449 B1 * | 9/2002 | Veiga et al. | 442/218 |

FOREIGN PATENT DOCUMENTS

| | | |
|---|---|---|
| DE | 19738741 | 9/1997 |
| DE | 19812915 | 3/1998 |
| DE | 29804004 | 8/1998 |
| DE | 29813636 | 1/1999 |
| DE | 19926076 | 6/1999 |
| GB | 2314300 A | 12/1997 |

* cited by examiner

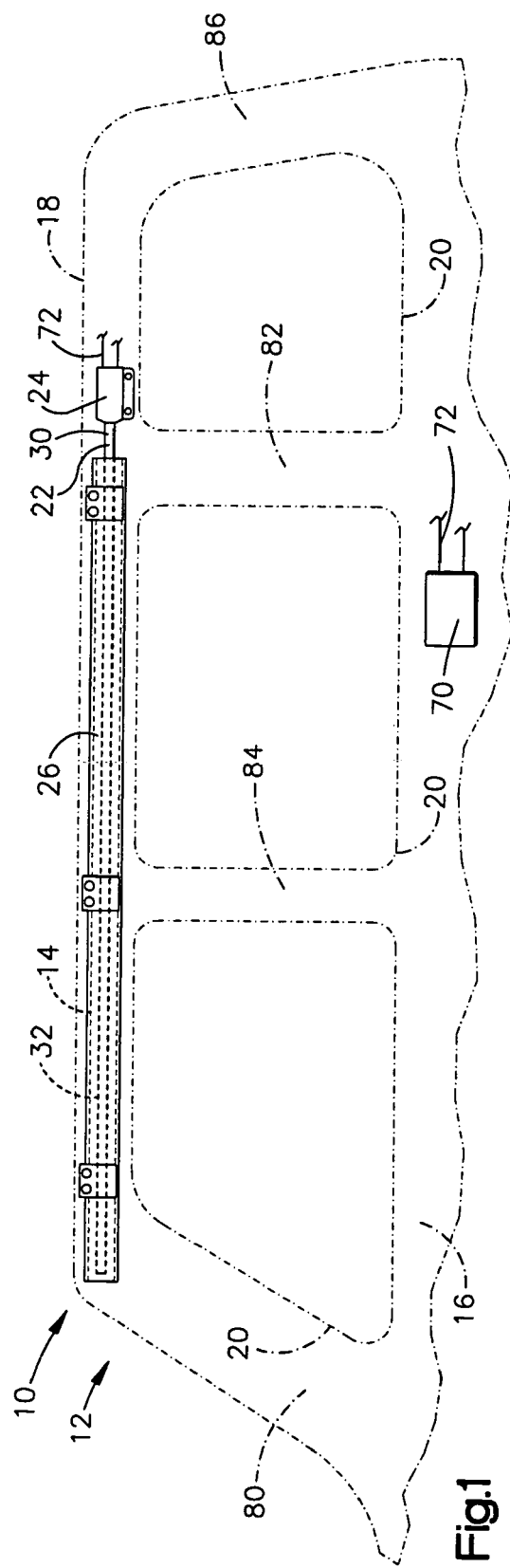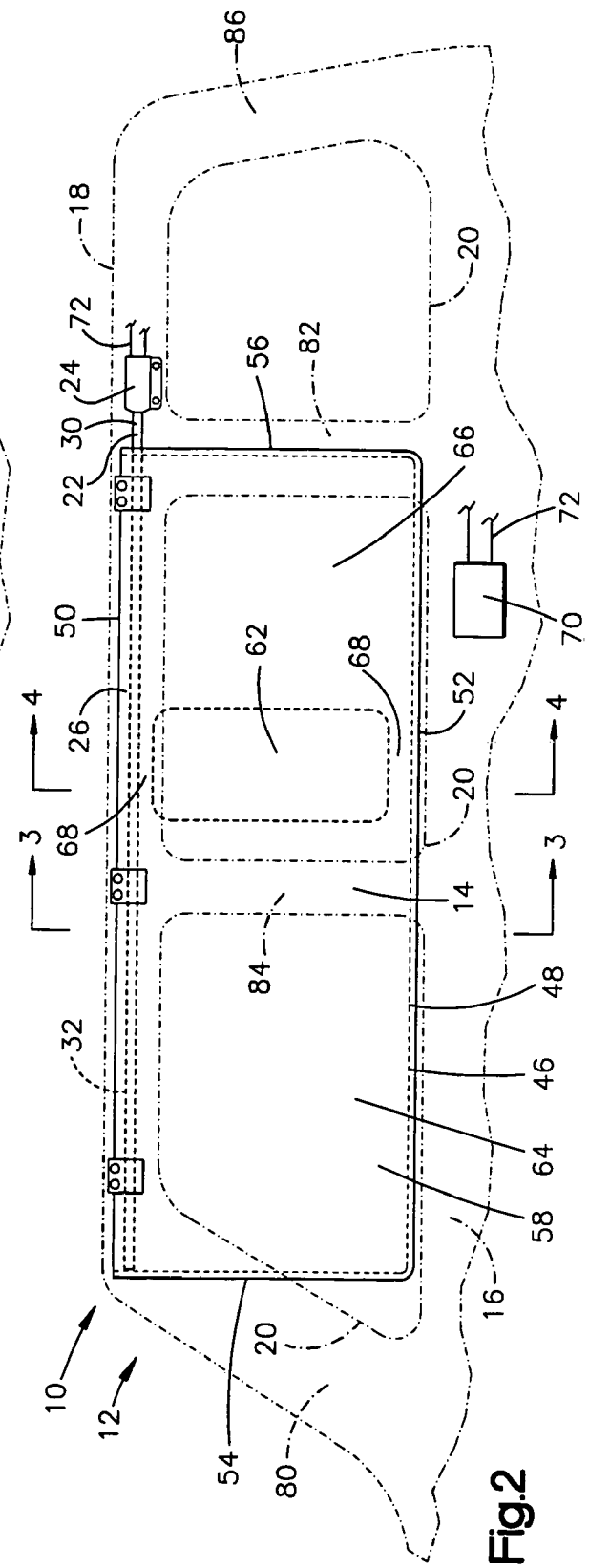

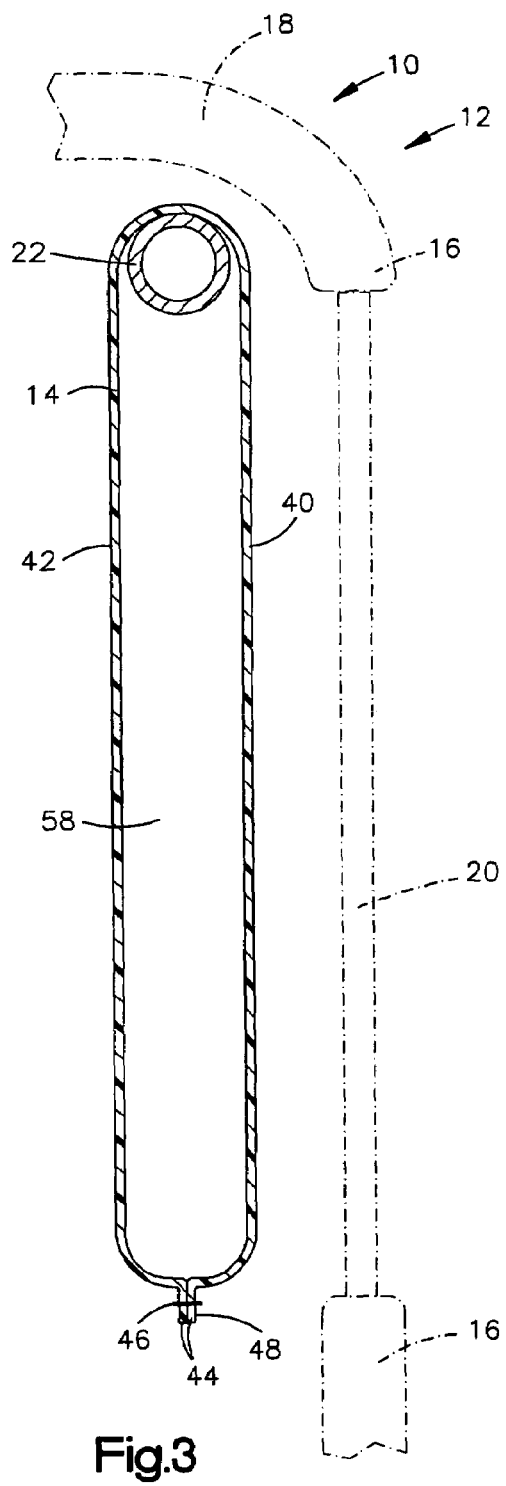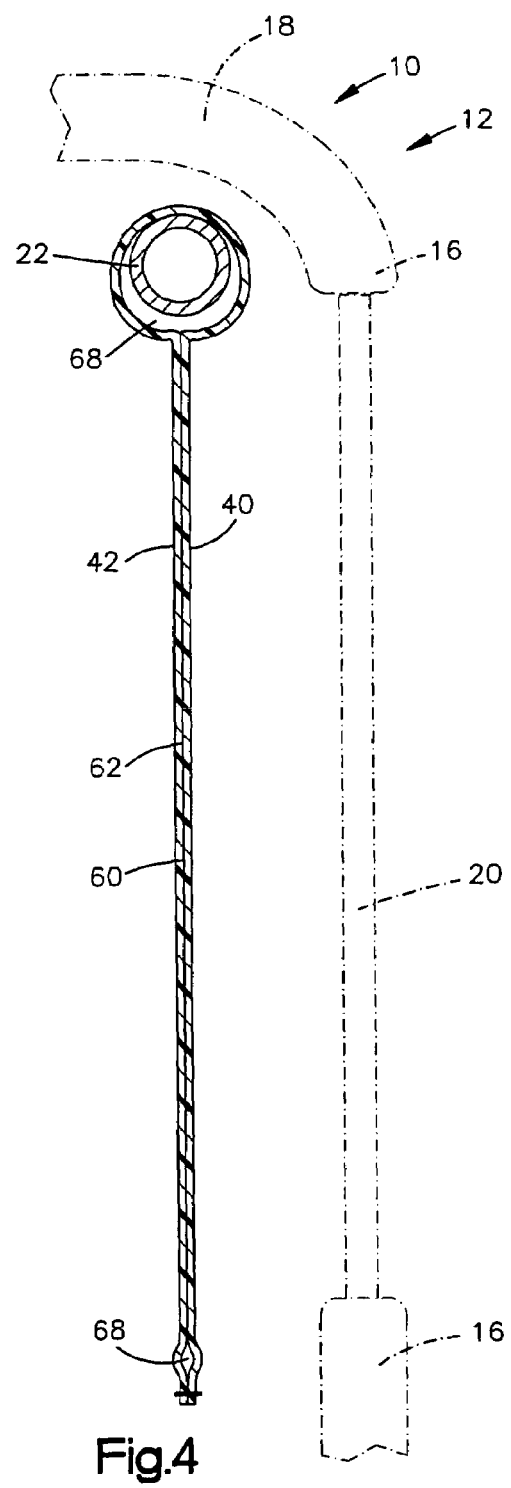

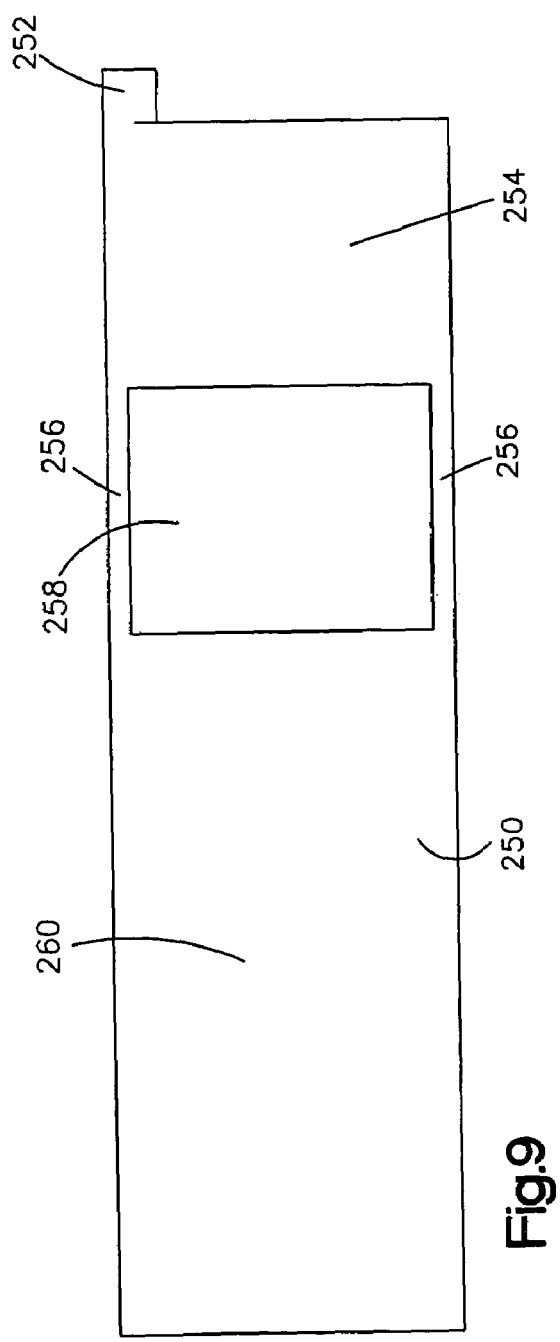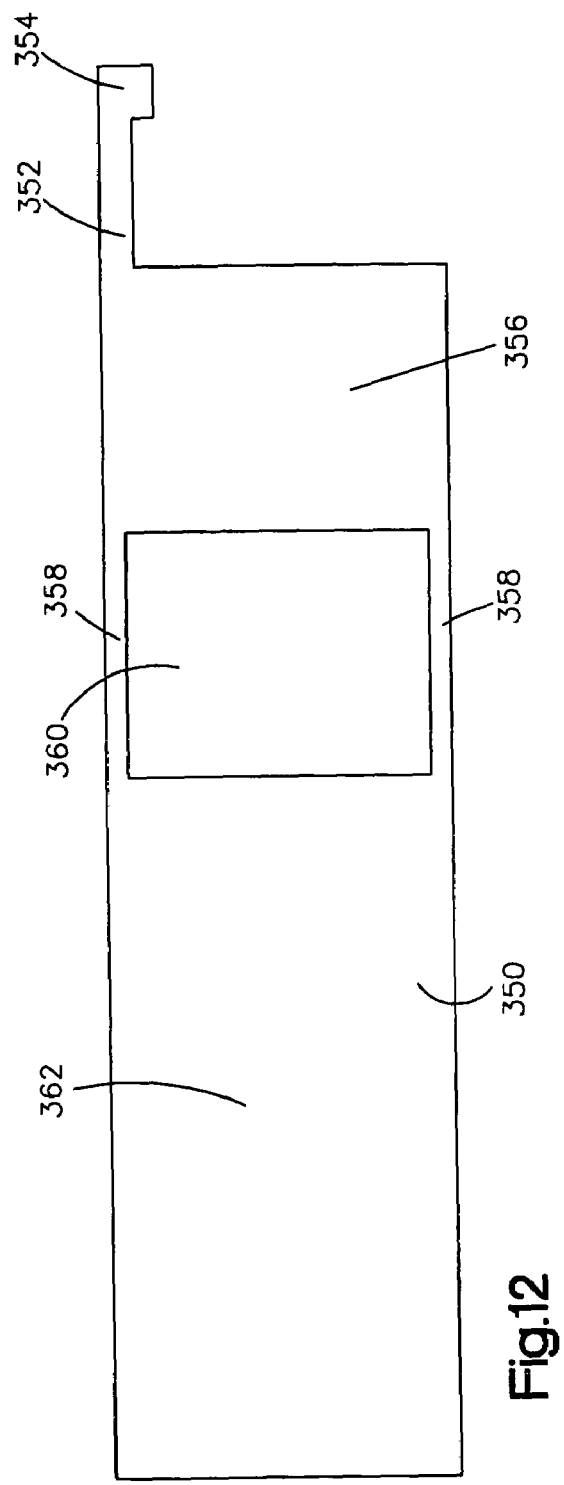

INFLATABLE SIDE CURTAIN WITH FILL TUBE

CROSS REFERENCE TO RELATED APPLICATIONS

This application is a continuation-in-part of U.S. Application Ser. No. 09/502,838, which was filed on Feb. 11, 2000 now abandoned.

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from adjacent the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus comprises an inflatable vehicle occupant protection device that is inflatable away from the roof into a position between the side structure of the vehicle and a vehicle occupant. The inflatable vehicle occupant protection device defines an inflatable volume and has a length extending along the side structure of the vehicle. The inflatable volume includes a forward portion located forward in the vehicle and a rearward portion located rearward in the vehicle.

An inflation fluid source provides inflation fluid for inflating the inflatable vehicle occupant protection device. The inflation fluid consists essentially of helium. A fill tube has a portion located in the inflatable vehicle occupant protection device that extends into the forward portion and the rearward portion of the inflatable volume. The fill tube is in fluid communication with the inflation fluid source. The inflation fluid source, when actuated, provides inflation fluid to the fill tube. The fill tube includes outlet apertures positioned along the portion of the fill tube that direct the inflation fluid into the inflatable volume to inflate the inflatable vehicle occupant protection device initially to a first desired pressure and maintain the inflatable vehicle occupant protection device inflated above a second desired pressure for a predetermined period of time. The predetermined period of time is at least 5–7 seconds.

The inflation fluid is directed through the outlet apertures into the forward portion and the rearward portion of the inflatable volume to inflate the forward and rearward portions. The inflation fluid directed into the forward portion and the inflation fluid directed into the rearward portion have generally the same temperature and a generally the same pressure during initial inflation of the inflatable vehicle occupant protection device. The temperature of the inflation fluid directed into the forward and rearward potions is about equal to an ambient temperature in which the inflatable vehicle occupant protection device is inflated for at least 95% of the predetermined period of time.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus for helping to protect an occupant of a vehicle according to the present invention illustrating the apparatus in a deflated condition;

FIG. 2 is a schematic view of the apparatus of FIG. 1 in an inflated condition;

FIG. 3 is a sectional view of the apparatus taken generally along line 3—3 in FIG. 2;

FIG. 4 is a sectional view of the apparatus taken generally along line 4—4 in FIG. 2;

FIG. 9 illustrates a model curtain for simulating the performance of an apparatus similar to the apparatus of FIG. 6 having certain features omitted;

FIG. 12 illustrates a model curtain for simulating the performance of an apparatus similar to the apparatus of FIG. 6 having certain features omitted and other features added;

DESCRIPTION OF PREFERRED EMBODIMENTS

Figure 5:
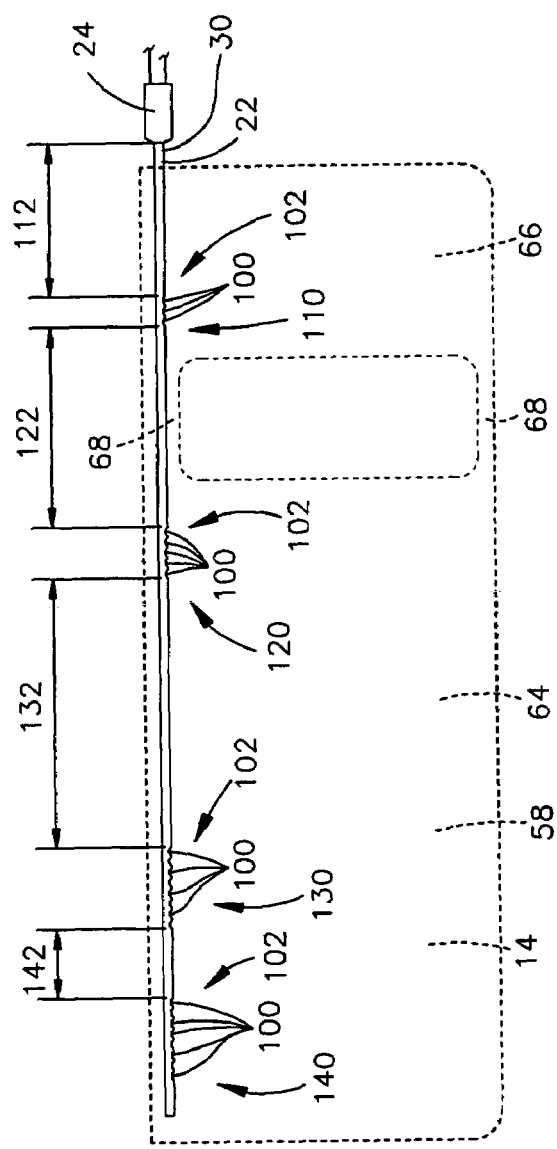
FIG. 5 is a schematic view of a portion of the apparatus of FIG. 1.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22. The inflator 24 contains a stored quantity of pressurized helium inflation fluid (not shown) for inflating the inflatable curtain 14.

The fill tube 22 has a first portion 30 for receiving fluid from the inflator 24. The fill tube 22 has a second portion 32 disposed in the inflatable curtain 14. The second portion 32 of the fill tube 22 has a plurality of openings (not shown in FIGS. 1 and 2) that provide fluid communication between the fill tube 22 and the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20. The roof 18 may be either a standard roof that is fixed in place or a convertible roof that can be moved or removed.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along at least a portion of the perimeter 48 of the panels. The overlapping portions 44 could alternatively be secured together by means such as dielectric sealing, ultrasonic bonding, heat sealing, or adhesives. The perimeter 48 is defined at least partially by an upper edge 50 (FIG. 2) of the inflatable curtain 14, an opposite lower edge 52 of the curtain, and front and rear edges 54 and 56 of the curtain spaced apart horizontally along the upper and lower edges. The perimeter 48 defines an inflatable volume 58 of the inflatable curtain 14. Although the upper and lower edges 50 and 52 and the front and rear edges 54 and 56 are shown as straight lines, the upper and lower edges could be curved or angled. The upper and lower edges 50 and 52 thus might intersect and eliminate either or both of the front and rear edges 54 and 56.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels. The first and second panels 40 and 42 may also be woven together around their perimeters to form the inflatable curtain 14.

The first and second panels 40 and 42 are constructed of a fabric, such as nylon, that is coated with a gas impermeable material, such as urethane or silicone. The inflatable curtain 14 thus may have a substantially gas-tight construction. Other materials, such as elastomers, plastic films, or combinations thereof, may also be used to construct the inflatable curtain 14. The first and second panels 40 and 42 may also be formed of single or multi-layered sheets of material.

As illustrated in FIG. 4, the first and second panels 40 and 42 may be connected together by known means 60, such as stitching, dielectric sealing, ultrasonic bonding, heat sealing, adhesives, tethers, or weaving the panels together, to form a non-inflatable area 62 within the inflatable volume 58 (FIG. 2) of the inflatable curtain 14. Such a non-inflatable area 62 may be desirable in areas along the side structure 16 of the vehicle 12 where occupants are unlikely to come into contact with the side structure. This may help to reduce the amount of inflation fluid required to fill the inflatable curtain 14 and reduce the time required to inflate the curtain. Such a non-inflatable area 62 may also be desirable to help control the thickness of the inflatable curtain 14 and to define inflatable chambers of the curtain.

As illustrated in FIG. 2, the non-inflatable area 62 is generally rectangular. It will be recognized by those skilled in the art, however, that it may be desirable for the non-inflatable area 62 to have a different configuration, depending upon the particular design of the inflatable curtain 14, the shape of the vehicle 12 in which the apparatus 10 is being installed, and the desired shape of the inflatable portion(s) of the curtain. For example, the non-inflatable area 62 could consist of linear connections such that the panels are connected along straight or curved lines, areas of connection such that the curtain panels are connected together in areas defined by straight or curved boundaries, or a combination of linear connections and area connections.

In the illustrated embodiment, the non-inflatable area 62 helps to define inflatable forward and rearward portions 64 and 66, respectively, of the inflatable volume 58 of the inflatable curtain 14. In the illustrated embodiment, the forward and rearward portions 64 and 66 are connected in fluid communication with each other by passages 68 that extend along the upper and lower edges 50 and 52 of the inflatable curtain 14 between the respective upper and lower edges and the non-inflatable area 62. The forward and rearward portions 64 and 66, however, may not be connected in fluid communication with each other. When the inflatable curtain 14 is inflated, the forward portion 64 is positioned forwardly in the vehicle 12, between the side structure 16 of the vehicle and any occupants seated forwardly in the vehicle. The inflated rearward portion 66 is positioned rearwardly in the vehicle 12, between the side structure 16 of the vehicle and any occupants seated rearwardly in the vehicle.

The vehicle 12 includes a sensor mechanism 70 (shown schematically in FIGS. 1 and 2) for sensing a side impact to the vehicle 12 and/or a rollover of the vehicle 12. The sensor mechanism 70 actuates the inflator 24 in response to the sensing of a side impact or a vehicle rollover. In the event of a rollover of the vehicle 12 or a side impact to the vehicle for which inflation of the inflatable curtain 14 is desired, the sensor mechanism 70 provides an electrical signal over lead wires 72 to the inflator 24. The electrical signal causes the inflator 24 to be actuated in a known manner. The inflator 24 discharges inflation fluid under pressure into the fill tube 22. The fill tube 22 directs the inflation fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 of the inflatable curtain 14 is positioned adjacent the intersection of the roof 18 and the side structure 16 of the vehicle 12. The front edge 54 of the inflatable curtain 14 is positioned adjacent an A pillar 80 of the vehicle 12. The rear edge 56 of the inflatable curtain 14 is positioned adjacent a C pillar 82 of the vehicle 12. The inflatable curtain 14 extends between the A pillar 80 and the C pillar 82 of the vehicle 12 and overlies at least a portion of the A pillar, C pillar, and a B pillar 84 of the vehicle.

It will be recognized by those skilled in the art that the inflatable curtain may have alternative configurations. For example, in the illustrated embodiment, the inflatable curtain 14 extends between the A pillar 80 and the C pillar 82 of the vehicle 12. The inflatable curtain 14 could, however, extend between the A pillar 80 and the B pillar 84 only or between the B pillar and the C pillar 82 only. Also, the inflatable curtain 14 could, when inflated, extend between the A pillar 80 and a D pillar 86 of the vehicle 12.

The inflatable curtain 14, when inflated, helps to protect a vehicle occupant in the event of a vehicle rollover or a side impact to the vehicle 12. The non-inflatable portion 62 helps to limit the thickness of the inflated inflatable curtain 14 and helps to reduce the overall volume of the curtain. The forward and rearward portions 64 and 66, when inflated, help to absorb the energy of impacts with the inflatable curtain 14 and help to distribute the impact energy over a large area of the curtain. The passages 68 also help to distribute the impact energy over a large area of the inflatable curtain 14 by allowing inflation fluid to move between the forward and rearward portions 64 and 66 upon impacts with the curtain.

Once the inflatable curtain 14 is inflated, it is desirable for the inflation fluid in the curtain to be maintained at a desired pressure in order to help prevent vehicle occupants from penetrating through the curtain. By "penetrating through," it is meant that the pressure of the inflation fluid in the inflatable curtain is insufficient to prevent an occupant from moving the first and second panels together upon striking the curtain and the occupant thus essentially strikes the side structure 16 of the vehicle 12. Initially, the inflatable curtain 14 is inflated to a desired pressure, preferably between 149–163 kilopascals (kPa) absolute (between about 48–62 kPa gauge), within 20–30 milliseconds (ms). Once inflated, the inflatable curtain 14 is maintained at the desired pressure (149–163 kPa absolute) throughout about the first 100 milliseconds of inflation. Thereafter, the inflation pressure may decay due to leakage or cooling. Once inflated, the inflation pressure should remain above a second desired pressure, preferably 125 kPa absolute, for a predetermined period of time, preferably at least about the first 5–7 seconds of inflation. This second desired pressure may, however, be higher or lower depending upon factors such as the volume of the inflatable curtain 14 and the thickness of the curtain when inflated.

Preferably, the inflatable curtain 14, initially, is inflated to the desired pressure (149–163 kPa absolute) within 20–30 milliseconds. In order to achieve the desired pressure in the inflatable curtain 14 when the curtain is initially inflated, the inflator 24 must deliver a given amount of inflation fluid according to the volume of the curtain. A preferred inflator 24 is a stored gas inflator containing compressed helium at about 6250 psig. In order to achieve the desired pressure in an inflatable curtain having a volume ranging between 12–50 liters, the preferred inflator must deliver between 0.7–3.3 moles of helium gas. For example, an inflatable curtain having a volume of about 27 liters may require about 2.2 moles of helium gas in order to achieve a desired inflation pressure.

Those skilled in the art will recognize that the amount of inflation fluid delivered to the inflatable curtain 14 must account for losses due to leakage, curtain stretching/expansion, etc. This is especially true when using helium inflation fluid because helium, having a low atomic weight, flows more easily through leakage points than other gasses. Therefore, leakage and other losses are taken into account when sizing the inflator 24. Also, special care may be taken to seal the inflatable curtain 14 and any connections between the curtain and the inflator 24 and/or fill tube 22 where leakage may occur.

It is also desirable for the front and rear portions 64 and 66 of the inflatable curtain 14 to inflate away from the roof 18 evenly between the forward and rearward portions 64 and 66 along the length of the curtain. It is further desirable for the pressure and temperature of the inflation fluid in the forward portion 64 of the inflatable curtain 14 to be the same as the pressure and temperature, respectively, of the inflation fluid in the rearward portion 66 of the inflatable curtain throughout the predetermined period of time, i.e., at least the first 5–7 seconds of inflation. According to the present invention, therefore, the fill tube 22 is constructed such that the inflatable curtain 14 inflates generally evenly between the forward and rearward portions 64 and 66 along the length of the curtain. The fill tube 22 is also constructed such that the inflation fluid in the curtain 14 has generally the same temperature and generally the same pressure in the forward and rearward portions 64 and 66 along the length of the curtain throughout the predetermined period of time.

As illustrated in FIG. 5, the second portion 32 of the fill tube 22 includes a plurality of outlet apertures 100 that are spaced along the length of the second portion 32 of the fill tube. The outlet apertures 100 are arranged in groups of apertures 102, each of which includes a predetermined number of apertures spaced along a line that extends along a portion of the length of the fill tube 22. The groups of apertures 102 are spaced a predetermined distance apart from each other along the length of the fill tube 22.

In the illustrated embodiment, the fill tube 22 preferably has an outside diameter of about 15.875 millimeters and a wall thickness of about 0.71 millimeters. The outlet apertures 100 are preferably pierced holes having a diameter in the range of about 7.0–9.0 millimeters. The outlet apertures 100 may, however, have a different geometry in order to produce a desired effect, such as directing the inflation fluid in a certain direction from the fill tube 22. The outlet apertures 100 in each of the groups of apertures 102 are spaced apart from each other about 12.0 millimeters center to center.

In the illustrated embodiment, a first group of apertures 110 includes three outlet apertures 100. The first group of apertures 110 is spaced a distance indicated at 112 from the inflator 24. The distance 112 is preferably about 490 millimeters. A second group of apertures 120 includes five outlet apertures 100. The second group of apertures 120 is spaced a distance indicated at 122 from the first group of apertures 110. The distance 122 is preferably about 144 millimeters. A third group of apertures 130 includes eight outlet apertures 100. The third group of apertures 130 is spaced a distance indicated at 132 from the second group of apertures 120. The distance 132 is preferably about 485 millimeters. A fourth group of apertures 140 includes eight outlet apertures 100. The fourth group of apertures 140 is spaced a distance indicated at 142 from the third group of apertures 130. The distance 142 is preferably about 85 millimeters.

It will be recognized by those skilled in the art that the cross-sectional flow area of the fill tube 22, the number of groups of apertures 102, the number of apertures 100 in each group, and the spacing of the groups may vary depending upon the construction of the inflatable curtain 14. For example, in an inflatable curtain 14 extending between the A and B pillars 80 and 84, there may be fewer groups of apertures 102 and fewer outlet apertures 100 in the groups. Conversely, in a curtain extending between the A and D pillars 80 and 86, there may be more groups of apertures 102 and more outlet apertures 100 in the groups.

The distances between the groups of apertures 102 and the number of outlet apertures 100 in each group of apertures are predetermined in order to help ensure that the forward and rearward portions 64 and 66 of the inflatable curtain 14 are inflated evenly along the length of the curtain. As illustrated in FIG. 5, the rearward portion 66 has a smaller volume than the forward portion 64. The inflation fluid is directed into the rearward portion 64 by the first group of apertures 110. The number and spacing of the outlet apertures 100 in the first group of apertures 110 is predetermined such that the volume of inflation fluid delivered into the rearward portion 66 inflates the rearward portion to a desired pressure in a desired time.

The forward portion 64 of the inflatable curtain 14 has a considerably larger volume than the rearward portion 66. Thus, the volume of inflation fluid delivered into the forward portion 66 must be considerably larger than the volume delivered into the rearward portion 64. The number and spacing of the outlet apertures 100 in the second, third and fourth groups of apertures 120, 130, and 140 is predetermined such that the volume of inflation fluid delivered into the forward portion 64 inflates the forward portion to the same desired pressure in the same time as the rearward portion 66. This helps to ensure that the forward and rearward portions 64 and 66 will inflate evenly along the length of the inflatable curtain 14.

When the inflator 24 is actuated, there is a large pressure differential between the compressed inflation fluid in the inflator and the gas occupying the fill tube 22. As a result, the inflation fluid accelerates from the inflator 24 into the fill tube 22, reaching a supersonic velocity. Once inside the fill tube 22, the inflation fluid slows to a velocity below supersonic speed as pressure builds in the fill tube. As pressure rises in the fill tube 22, a large pressure differential is created between the tube and the inflatable curtain 14. This causes the inflation fluid to reach a supersonic velocity as the fluid enters the inflatable curtain 14 through the outlet apertures 100.

By "supersonic velocity", it is meant that the velocity is above that of the speed of sound in a given medium. For example, based on known principles of gasses, the speed of sound of helium will be a given velocity at a given temperature. Thus, a supersonic velocity of helium at the given temperature would be above the given velocity.

When the inflation fluid reaches a supersonic velocity as it enters the fill tube 22 from the inflator 24, a shock wave is created, which propagates back and forth along the length of the tube. As the shock wave propagates along the fill tube 22, fluid temperatures at the end of the tube can reach maximum temperatures in the range of 1000–1750 degrees Kelvin. These high fluid temperatures are a result of adiabatic compressive heating of air that is in the fill tube 22 prior to actuation of the inflator 24 and isentropic heating of the helium and air gas mixture as the shock wave passes through the fluid media in the tube. Also as the inflation fluid passes through the fill tube 22, the fluid gains heat thermodynamically from the tube, which results in higher pressures in the inflatable curtain 14 for a given amount of inflation fluid.

For purposes of the present invention, ambient temperature is defined as 295° K., which is equal to about 22° C. or 71.6° F. As the inflation fluid enters the inflatable curtain 14, the fluid quickly cools to a temperature just above the ambient temperature in which the inflatable curtain 14 is deployed. This helps to ensure that the desired pressure of the inflation fluid in the inflatable volume 58 of the inflatable curtain 14 is maintained. The temperature of the inflation fluid in the inflatable curtain 14, being just above ambient temperature, will be less susceptible to pressure loss due to thermodynamic heat loss. For example, if the inflation fluid in the inflatable curtain 14 was at a significantly higher temperature than the ambient temperature, the inflation fluid pressure in the curtain would decrease as the fluid is cooled.

The above-listed results are achieved by using helium in conjunction with the above described fill tube construction to inflate the inflatable curtain 14. The use of the pressurized helium inflation fluid is thus critical to the present invention.

In the illustrated embodiment, the inflatable curtain 14 has a volume of about 27 liters. Based on the known physical properties of helium, it was determined that about 2.2 moles of helium are required to inflate the inflatable curtain 14 to the initial required pressure of about 149–163 kPa absolute. As stated above, it was also known that the inflatable curtain 14 must be inflated initially to the inflated position (FIG. 2) and to the desired pressure within about 20–30 milliseconds.

Knowing these requirements, the inflator 24 and fill tube 22 were sized so as to provide the helium inflation fluid to the inflatable curtain 14 to inflate the curtain initially to the desired pressure (149–163 kPa absolute) in the required time (20–30 ms). In the illustrated embodiment, the inflator 24 stores the helium at about 6250 psig and the fill tube 22 is sized in order to deliver the inflation fluid at a molar flow rate sufficient to fill the inflatable curtain 14 to the required pressure in the required amount of time. In sizing the fill tube 22, the cross-sectional flow area of the tube and the number of apertures 100 are selected to provide the amount of inflation fluid required to inflate the inflatable curtain 14 to the desired pressure in the required time. Also, in sizing the fill tube 22, the outlet apertures 100 were numbered, grouped, and spaced in order to inflate the inflatable curtain 14 evenly along the length of the curtain. The apparatus 10, thus configured, would inflate the inflatable curtain 14 to the desired pressure evenly along the length of the inflatable curtain 14, within the required amount of time (20–30 ms).

The cross-sectional flow area of the fill tube 22 is also sized so as to cause the helium inflation fluid to maintain supersonic velocity in the fill tube during deployment of the inflatable curtain 14. As stated above, the helium inflation fluid gains heat through compressive heating of the air in the fill tube 22, shock wave propagation/oscillation along the length of the fill tube, and thermodynamic heat transfer from the tube. As the helium inflation fluid enters the inflatable curtain 14, the fluid quickly cools to a temperature just above ambient temperature which, as stated above, helps to prevent pressure loss in the curtain.

These results are facilitated through the use of the helium inflation fluid in combination with the described fill tube 22 construction. Inflation fluids other than helium do not produce the above-listed results, even if used in conjunction with the disclosed fill tube construction. Helium, having a low molecular weight, has a relatively high sonic flow rate compared to other gasses. Thus, at a given temperature, helium will flow through the fill tube and into the inflatable curtain 14 faster than a gas having a higher molecular weight. This allows the required amount of helium inflation fluid to be delivered via the stored gas inflator 24. Other gasses, having low sonic flow rates compared to helium, would not produce the required flow into the inflatable curtain 14 to inflate the device to the required pressure in the required time without some form of augmentation, such as added heat. Gasses other than helium, used in a stored gas inflator in conjunction with a fill tube constructed according to the present invention, would thus be incapable of achieving the desired results of inflating the inflatable curtain 14 to the desired pressure in the required time.

Also, both the critical temperature of helium (−267° C.) and the critical pressure of helium (33.8 psia) are low as compared to other gasses. This helps to ensure that the inflation fluid will remain in a gaseous state throughout inflation. Other gasses, having higher critical temperatures and pressures may require augmentation, such as added heat, in order to ensure that the inflation fluid will remain in a gaseous state throughout inflation.

Creation of the shock wave results in the heating of the helium inflation fluid in the fill tube 22. The properties of helium result in a better absorption of thermal energy from the surrounding hardware, e.g. the fill tube 22, for equivalent molar flow rates as compared to other gasses. Thus, as the helium inflation fluid passes through the fill tube 22, it gains more heat than would other gasses. The helium inflation fluid also loses heat quickly when it enters the inflatable curtain 14 and quickly cools to a temperature just above ambient temperature. Thus, the inflatable curtain 14 will experience a smaller amount of pressure loss over time due to cooling of the helium inflation fluid. As a result, the use of the helium inflation fluid results in more uniform pressure within the desired range during at least the initial 5–7 seconds of inflation of the inflatable curtain 14.

Exemplary of the benefits gained through the use of helium in an apparatus 10 constructed in accordance with the present invention, the following compares argon, which is a known inflation fluid, to helium. The sonic flow rate of a gas is determined according to the following equation:

$$c=(kG_c RT)^{1/2}$$

where:
c=sonic flow rate of the gas;
k=ratio of specific heats of the gas ($C_p/C_v$), where $C_p$ is the specific heat at constant pressure and $C_v$ is the specific heat of the gas at constant volume, (For He, k=1.66, for Ar, k=1.67);
$G_c$=a constant;
R=gas constant of the gas (He=386.3, Ar=38.7); and
T=temperature of the gas Based on the above-listed equation, it can be seen that, at a given temperature, the values for k, $G_c$, and T are essentially equal for both helium and argon. The only difference in the equations for helium and argon is that the gas constant, R, for helium is about ten times that of argon. Thus, at a given temperature, helium has a sonic flow rate of about $(10)^{1/2}$, or 3.16 times faster than argon. Thus, based on the equation listed above, in order to increase the sonic flow rate of argon to equal that of helium, the argon would need to be heated to a temperature about ten times the temperature of the helium.

Also, the critical temperature and critical pressure of argon (−122° C., 705 psia) is much higher than helium (−267° C., 33.8 psia). Thus, in order to use argon to inflate the inflatable curtain 14 to the required pressure in the required time, the argon must be heated to ensure that the argon remains above the critical temperature in order to remain in a gaseous state throughout inflation. This is typically done by augmentation, wherein the inflator includes a pyrotechnic material that adds heat to the inflation fluid. In providing inflation fluid at a higher temperature, however, the inflation fluid would be delivered to the inflatable curtain 14 at a temperature substantially higher than ambient temperature. As a result, the inflatable curtain 14 would experience pressure loss as the inflation fluid cools towards ambient temperature.

The above-listed results were verified by testing an apparatus constructed in accordance with the apparatus 10 of the illustrated embodiment. The tests were performed by inflating a 27 liter inflatable curtain 14 with 2.2 moles of helium stored at about 6250 psig in the inflator 24. The helium inflation fluid was delivered to the inflatable curtain 14 via the fill tube 22, which was constructed in accordance with dimensions about equal to those listed above.

According to the testing procedure, the inflatable curtain 14 was inflated from an unfolded condition. The inflatable curtain 14 therefore was not placed in a stored condition in the housing 26. During inflation, inflation fluid pressure in the inflatable curtain was monitored and recorded. The recorded data is illustrated in FIGS. 15–18.

Figure 15:
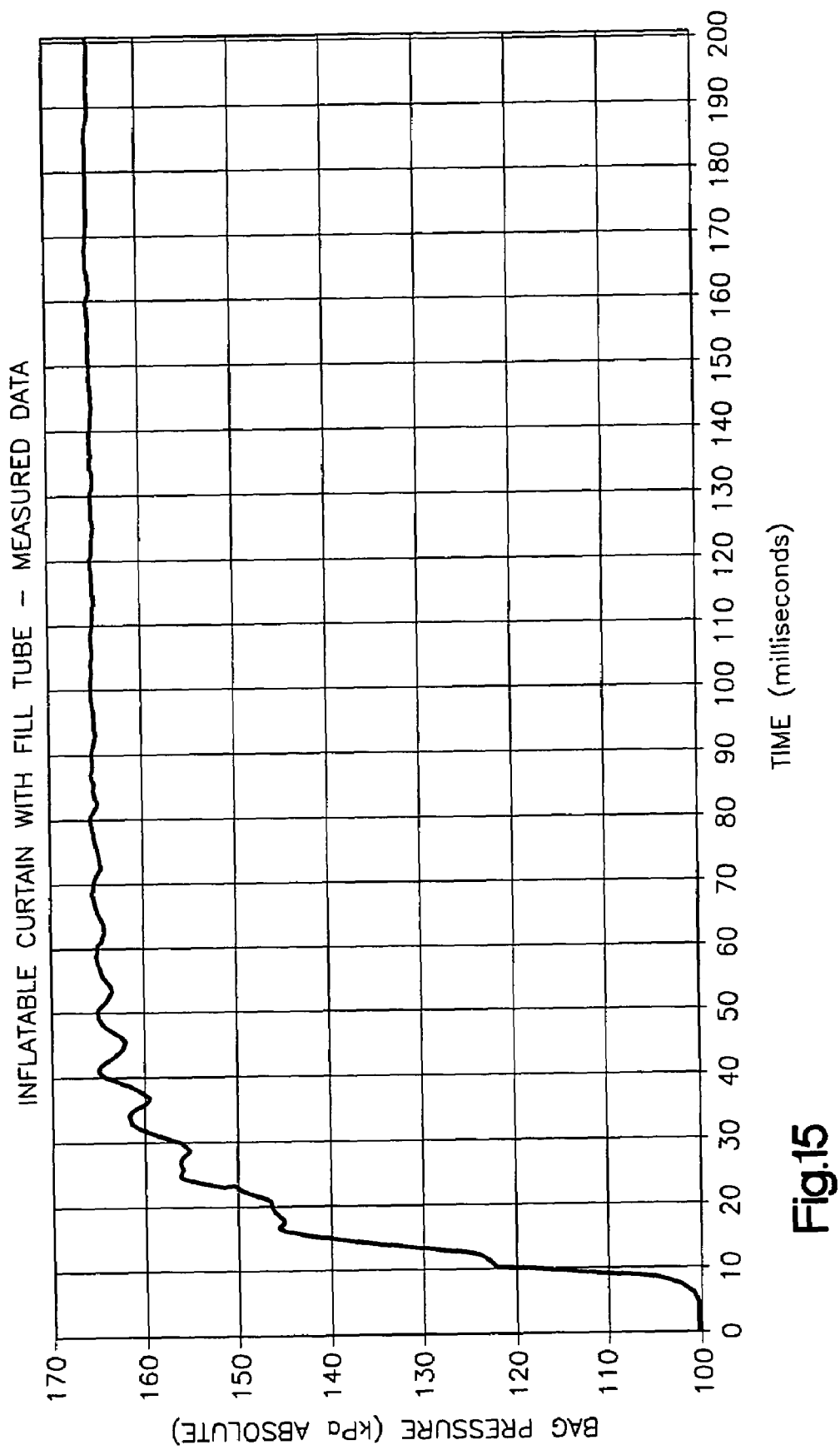
FIGS. 15–18 are graphs illustrating actual measured performance of an inflatable curtain in accordance with the apparatus of FIG. 1.

FIG. 15 illustrates the inflation pressure of the inflatable curtain 14 during the first 100 milliseconds of inflation. As shown in FIG. 15, the inflatable curtain 14 is inflated to about 146 kPa absolute at 20 milliseconds and about 157 kPa absolute at 30 milliseconds. The apparatus 10 thus inflates to well within the desired pressure range (149–163 kPa absolute) within the desired initial time period (20–30 ms).

Those skilled in the art will recognize that some of the inflation fluid pressure may be lost due to the work that the inflation fluid must perform in deploying the inflatable curtain 14 from a stored condition in the housing 26. The work can be attributed to opening the housing 26 (FIG. 1) and moving the inflatable curtain 14 to the deployed position (FIG. 2). Therefore, the inflation pressures experienced during the testing procedure may be slightly higher than those actually experienced when deploying the inflatable curtain 14 from the stored position. Such losses, however, are not large enough to reduce the inflation pressure of the inflatable curtain 14 to a pressure outside the desired inflation pressure range.

Figure 16:
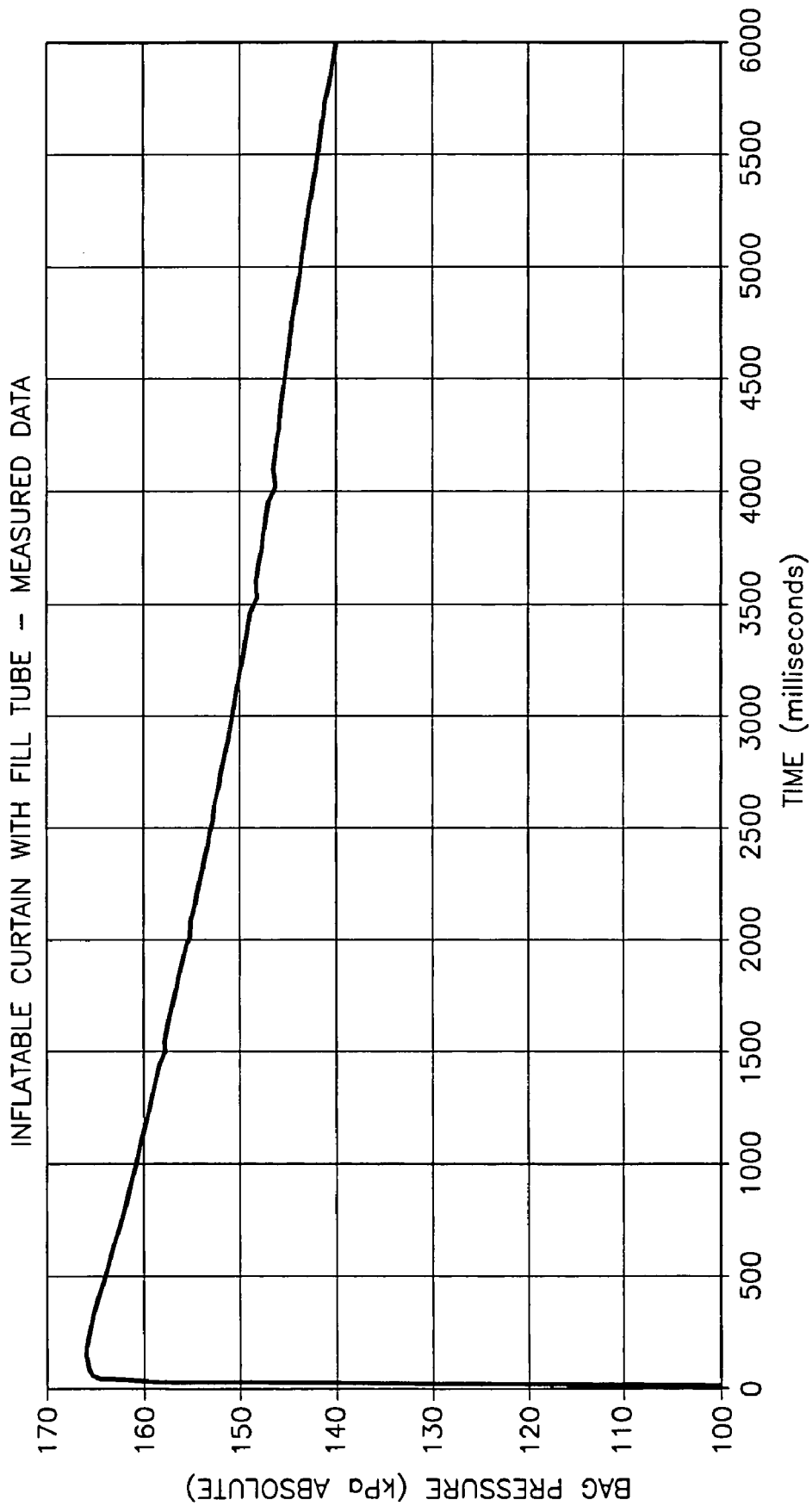

FIG. 16 illustrates the inflation pressure of the inflatable curtain during the first six seconds of inflation time. As illustrated in FIG. 16, the inflatable curtain 14, once inflated to a pressure at or above 149 kPa absolute, is maintained at or above 149 kPa absolute through the first 3.5 seconds of inflation. Thereafter, the inflatable curtain 14 is maintained at or above about 140 kPa absolute throughout the first six seconds of inflation time. Thus, once inflated, the inflatable curtain 14 is maintained well within the desired pressure ranges of 149–163 kPa absolute for the first 100 milliseconds, and above 125 kPa absolute for at least the first 5–7 seconds of inflation.

Figure 17:
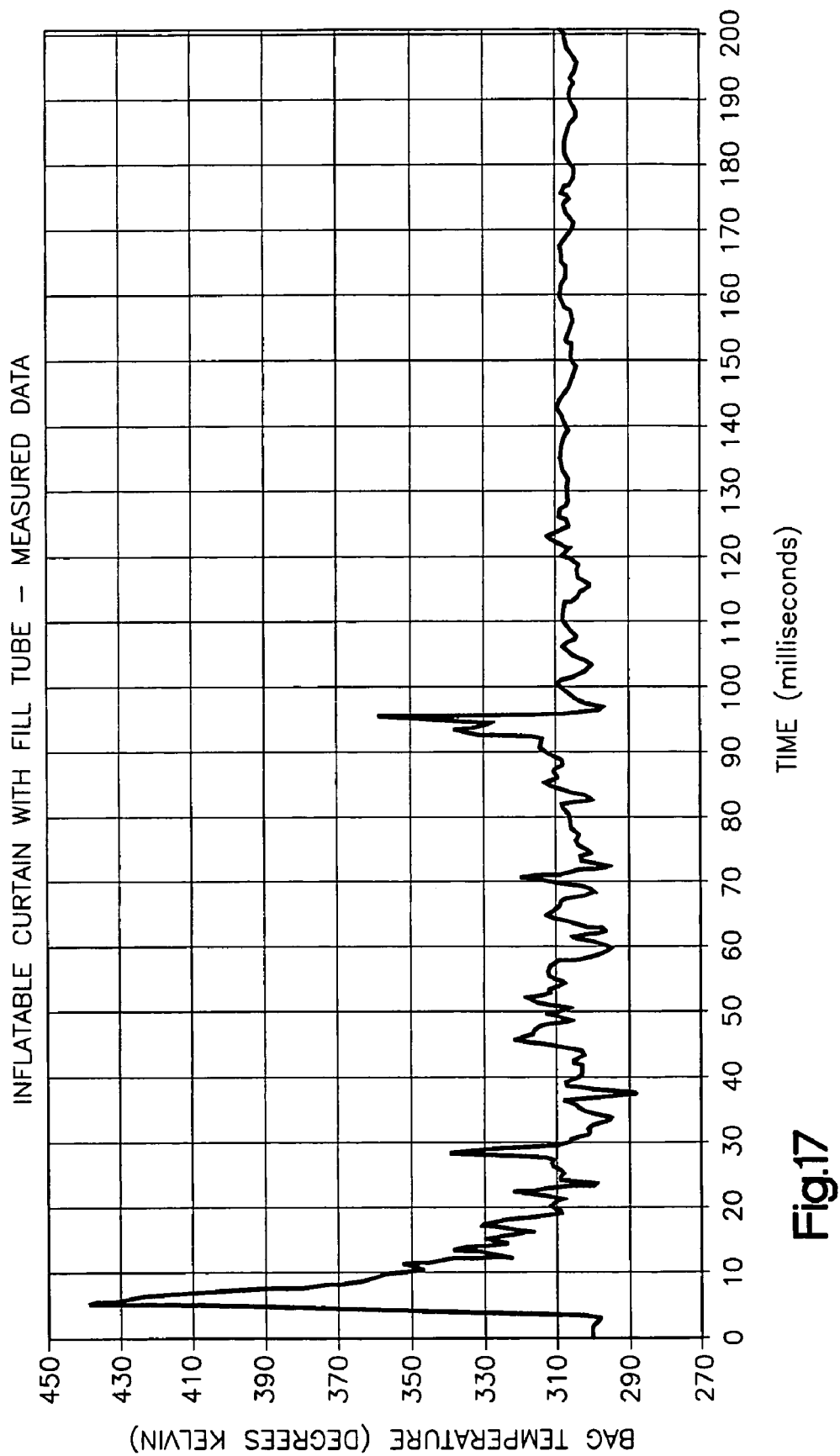
Figure 18:
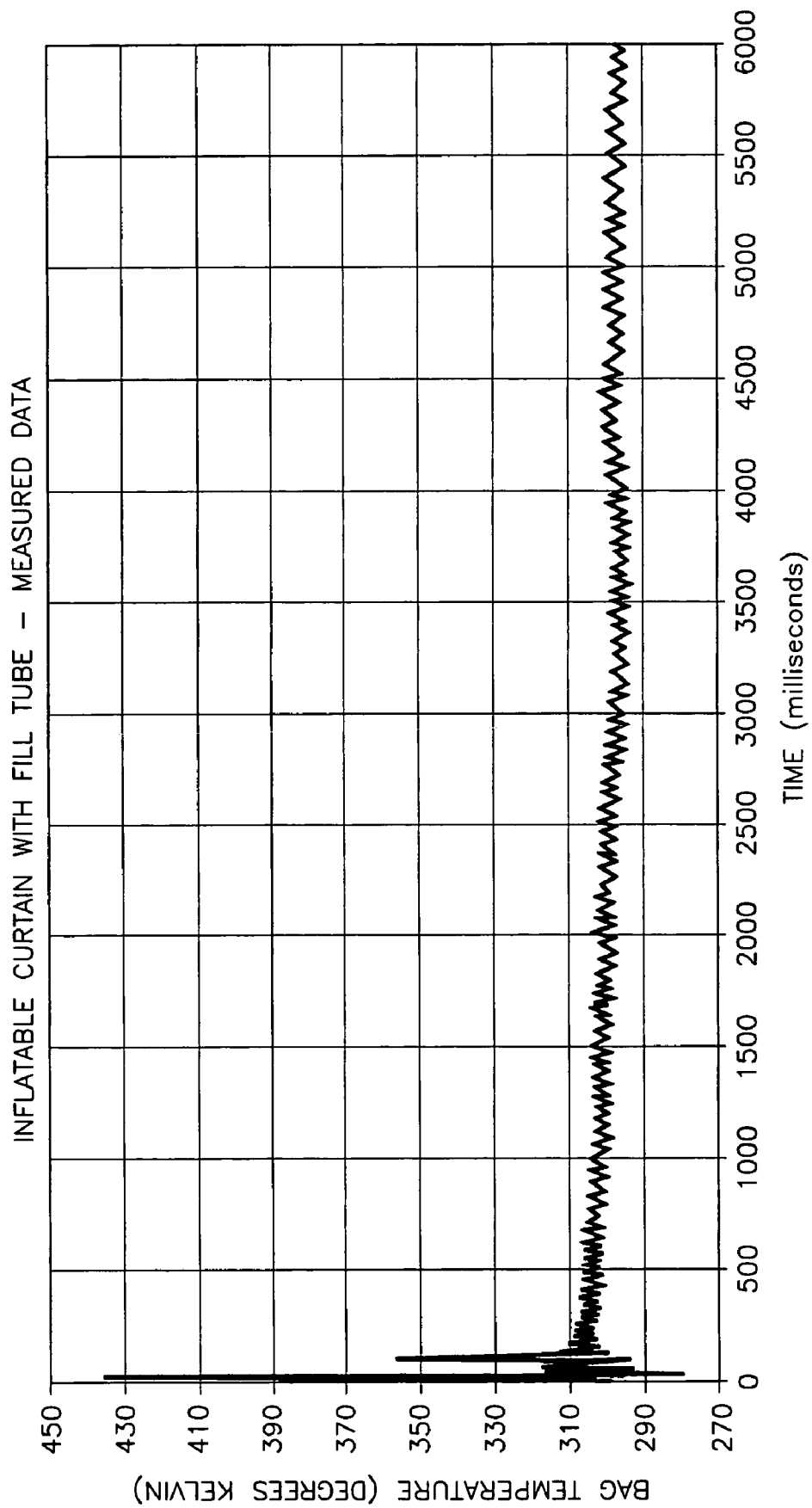

A similar test procedure was also performed with a similar apparatus 10 in order to monitor inflation fluid temperature during deployment of the inflatable curtain 14. The data recorded during this procedure is illustrated in FIGS. 17 and 18. As illustrated in FIG. 17, once inflated (20–30 ms), the inflation fluid temperature in the inflatable curtain 14 fluctuated generally between 290–330° K. At about 100 milliseconds, inflation fluid temperatures level out to about 305° K. (about 32° C. or 86° F.), just above ambient, and thereafter level out to about 295° K. (about 22° C. or 71.6° F.), about ambient, throughout the six second curtain deployment interval (see FIG. 18). By "just above ambient," it is meant that the temperature is preferably within about 10–15° C. above ambient. The inflatable curtain 14 is thus maintained at the desired temperature (about ambient) for a substantial portion, i.e., all but 100 milliseconds or about 98.3% of the initial six seconds of curtain inflation.

In determining the distances between the groups of apertures 102 and the number of outlet apertures 100 in each group of apertures, those skilled in the art will recognize that it is desirable to simulate the performance of a proposed inflatable curtain 14 and fill tube 22 construction. This can be accomplished by creating a computer-generated model that allows the performance of the curtain/fill tube construction to be monitored at various points in the curtain. The use of a computer-generated model also allows the design to be repeatedly evaluated and modified in order to achieve the desired performance without undergoing the time and expense of physical testing. One type of such a computer generated model is a two-dimensional computational fluid dynamics (CFD) model.

Figure 6:
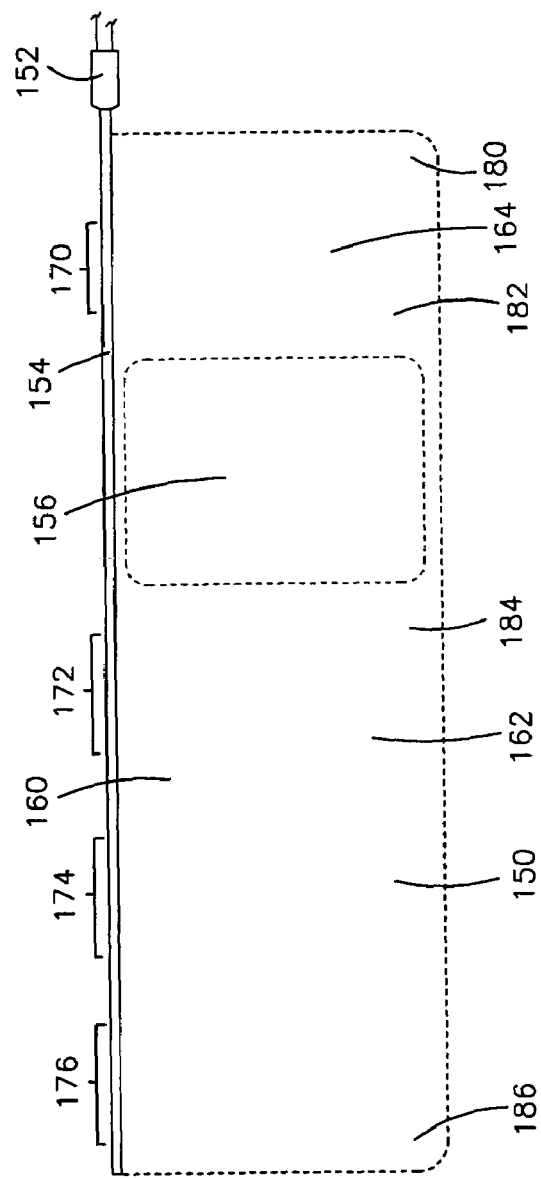
FIG. 6 illustrates a model curtain for simulating the performance of the apparatus of FIG. 1.

Using two-dimensional CFD modeling, the three-dimensional inflatable curtain 14 illustrated in FIGS. 1–5 is modeled by the model curtain 150 illustrated in FIG. 6. The model curtain 150 is designed to model a curtain having a volume of about 27 liters and an inflator 152 containing about 2.2 moles of compressed helium. The model curtain also includes a fill tube 154 and a non-inflatable portion 156. The non-inflatable portion 156 divides an inflatable volume 160 of the model curtain 150 into a forward portion 162 and a rearward portion 164. The locations of the first, second, third, and fourth groups of apertures in the fill tube 154 of the model curtain 150 are indicated at 170, 172, 174, and 176, respectively. It should be noted that the two-dimensional CFD model assumes zero leakage, zero material stretching, and zero loss due to work in moving the model curtain 150 from a stored position to the deployed position.

The use of the two-dimensional CFD model allows for monitoring the pressure and temperature of the inflation fluid at locations in the model curtain 150 during inflation of the model curtain. As illustrated in FIG. 6, the pressure and temperature of the inflation fluid is monitored in the rearward portion 164 at first and second locations 180 and 182, respectively. The pressure and temperature of the inflation fluid is monitored in the forward portion 162 at third and fourth locations 184 and 186, respectively. The pressure and temperature of the inflation fluid during inflation of the model curtain 150 can thus be recorded in order to evaluate the performance of the construction for which the model was developed.

Figure 7A:
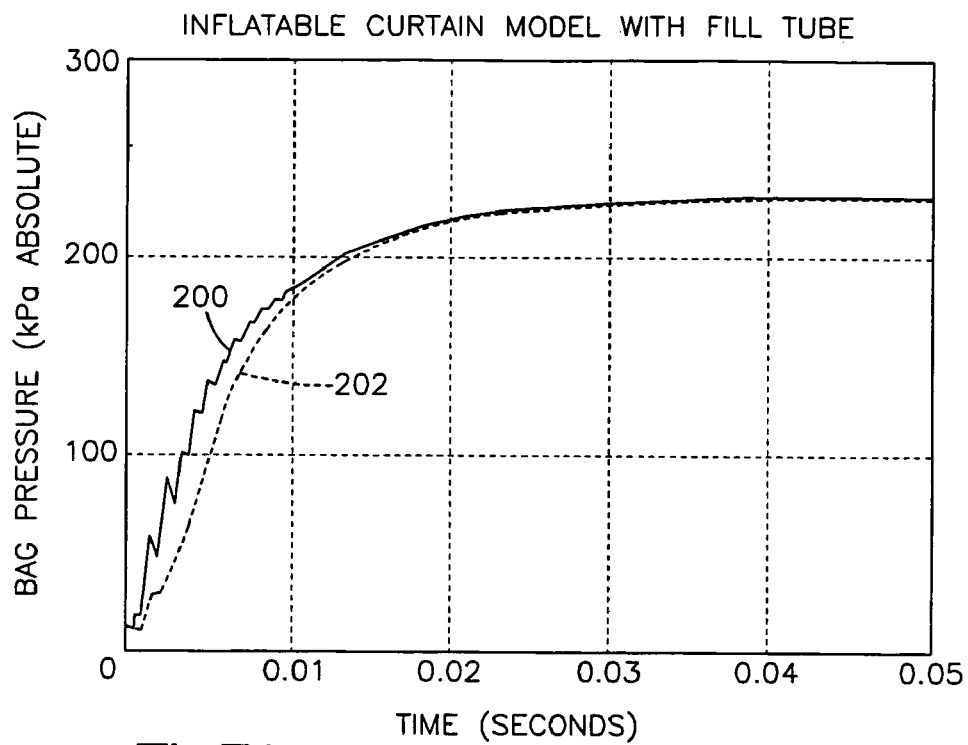
FIGS. 7a–b and 8a–b are graphs illustrating the performance of the model curtain of FIG. 6.
Figure 7B:
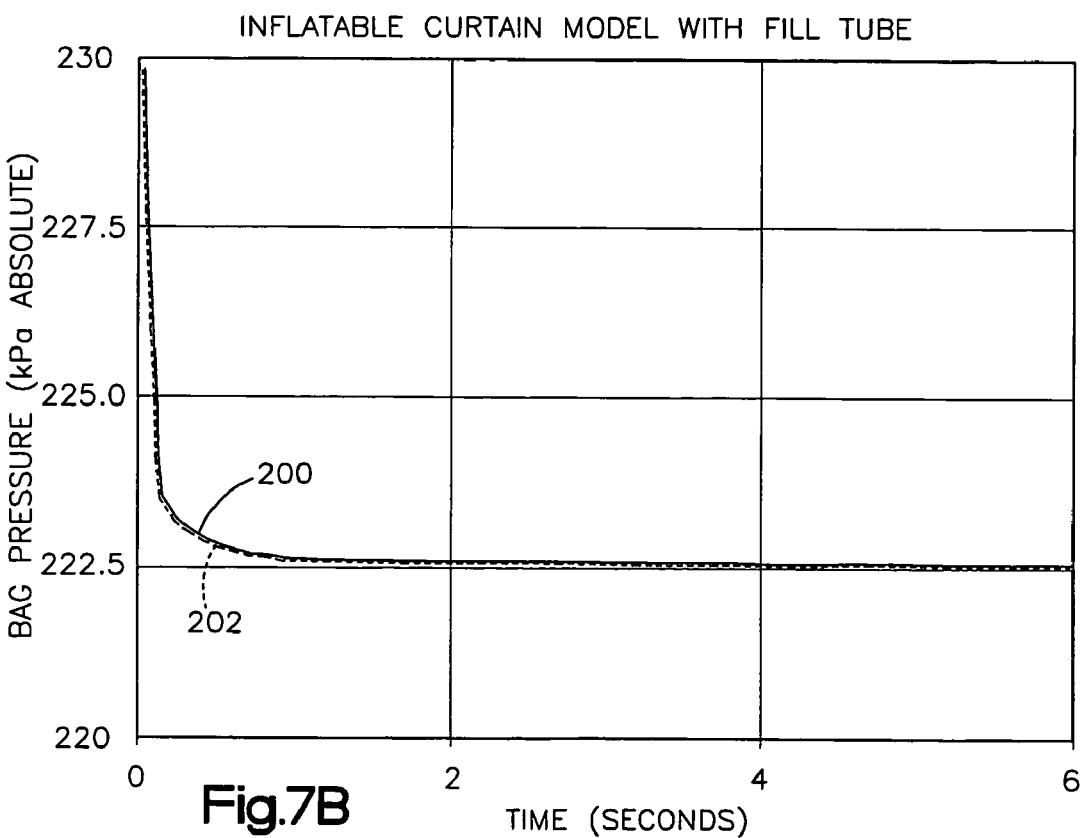

FIGS. 7a, 7b, 8a and 8b illustrate the performance of the model curtain 150 as constructed in accordance with the illustration of FIG. 6. FIGS. 7a and 7b illustrate the pressure of the inflation fluid during inflation of the model curtain 150. In FIGS. 7a and 7b, the solid line 200 represents the pressure in the forward portion 162 of the model curtain 150 measured by averaging the readings taken at locations 184 and 186. The dashed line 202 represents the pressure in the rearward portion 164 of the model curtain 150 measured by averaging the readings taken at locations 180 and 182. As shown in FIG. 7a, there is about a 25–50 kilopascals difference between the pressure of the inflation fluid in the forward portion 162 of the model curtain 150 and the pressure of the inflation fluid in the rearward portion 164 (FIG. 6) of the model curtain during the first eight to ten milliseconds of inflation time. Thereafter, the pressures in the forward and rearward portions 162 and 164 become the same. Thus, the pressure of the inflation fluid is generally the same in the forward and rearward portions 162 and 164 of the model curtain 150 during initial inflation of the curtain. As illustrated in FIG. 7b, the pressure in the forward and rearward portions 162 and 164 remain about the same at least through the first six seconds of inflation.

As viewed in FIG. 7a, the model curtain 150 inflates to about 225 kPa absolute in the initial 20–30 milliseconds of inflation. This corresponds to about 124 kilopascals gauge, which would appear to be substantially higher than the desired inflation pressure. As stated above, however, leakage, material stretching, and work losses are not included in the two-dimensional CFD model. In reality, these losses, especially leakage, may typically account for up to a 30–40% pressure loss, depending on the construction of the apparatus. This would bring the inflation pressure in the model curtain 150 down to about 74–86 kilopascals.

Figure 8A:
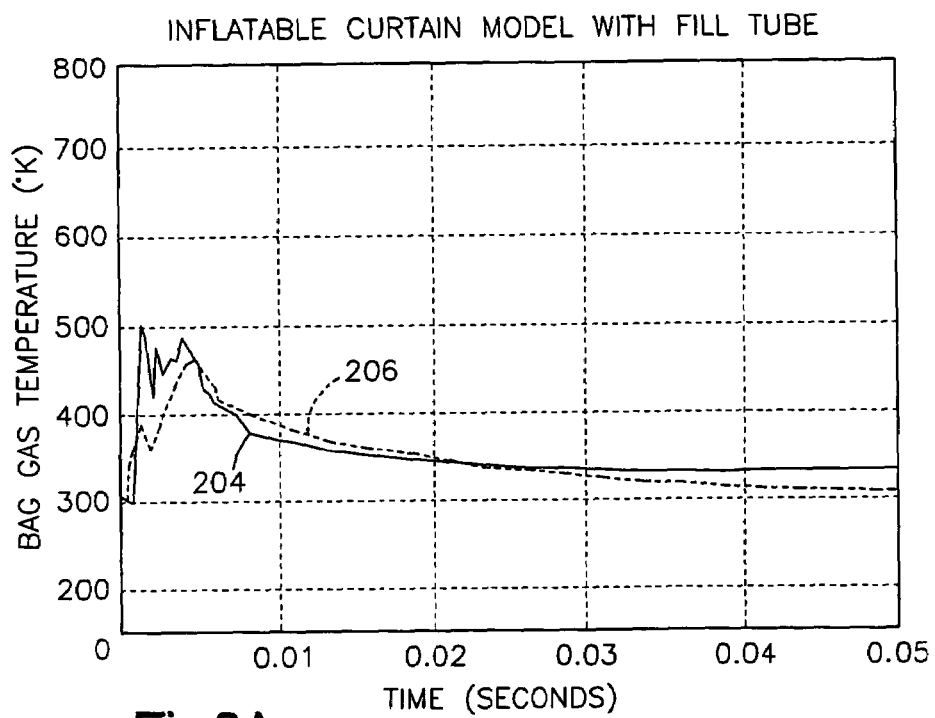
Figure 8B:
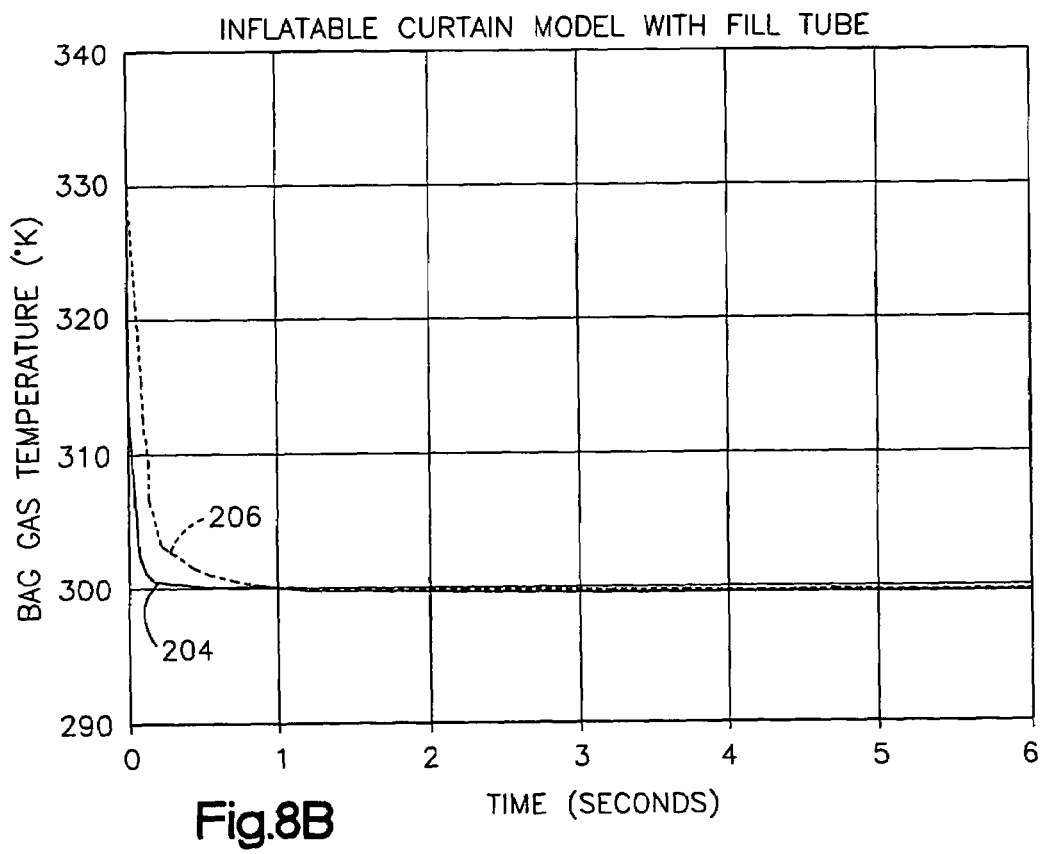

FIGS. 8a and 8b illustrate the temperature of the inflation fluid during inflation of the model curtain 150. The solid line 204 represents the temperature in the forward portion 162 of the model curtain 150 measured by averaging the readings taken at locations 184 and 186. The dashed line 206 represents the temperature in the rearward portion 164 of the model curtain 150 measured by averaging the readings taken at locations 180 and 182. As shown in FIG. 8a, there is only about a 25–125 degrees Kelvin difference between the temperature of the inflation fluid in the forward portion 162 of the model curtain 150 and the temperature of the inflation fluid in the rearward portion 164 of the model curtain during the first five milliseconds of inflation time. Thereafter, the temperatures of the inflation fluid in the forward and rearward portions 162 and 164 are within about 20 degrees Kelvin. Thus, the temperature of the inflation fluid is generally the same in the forward and rearward portions 162 and 164 of the model curtain 150 during initial inflation of the curtain. As shown in FIG. 8b, the temperature of the inflation fluid in the forward and rearward portions 162 and 164 remains about the same at least through the first six seconds of inflation.

Figure 10:
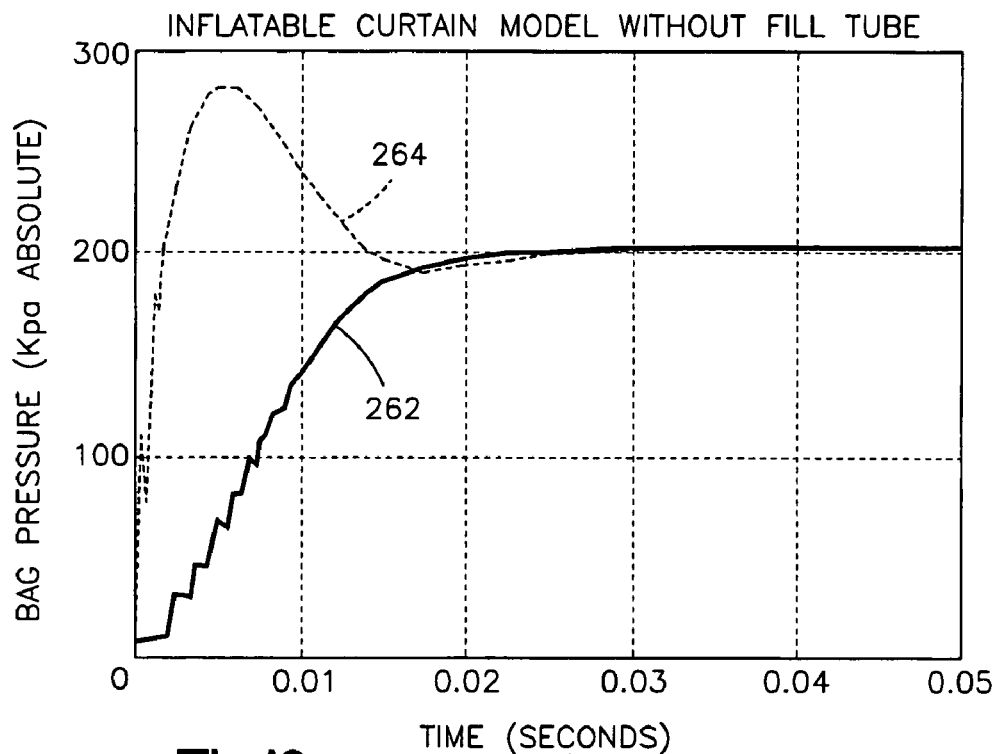
FIGS. 10–11 are graphs illustrating the performance of the model curtain of FIG. 9.
Figure 11:
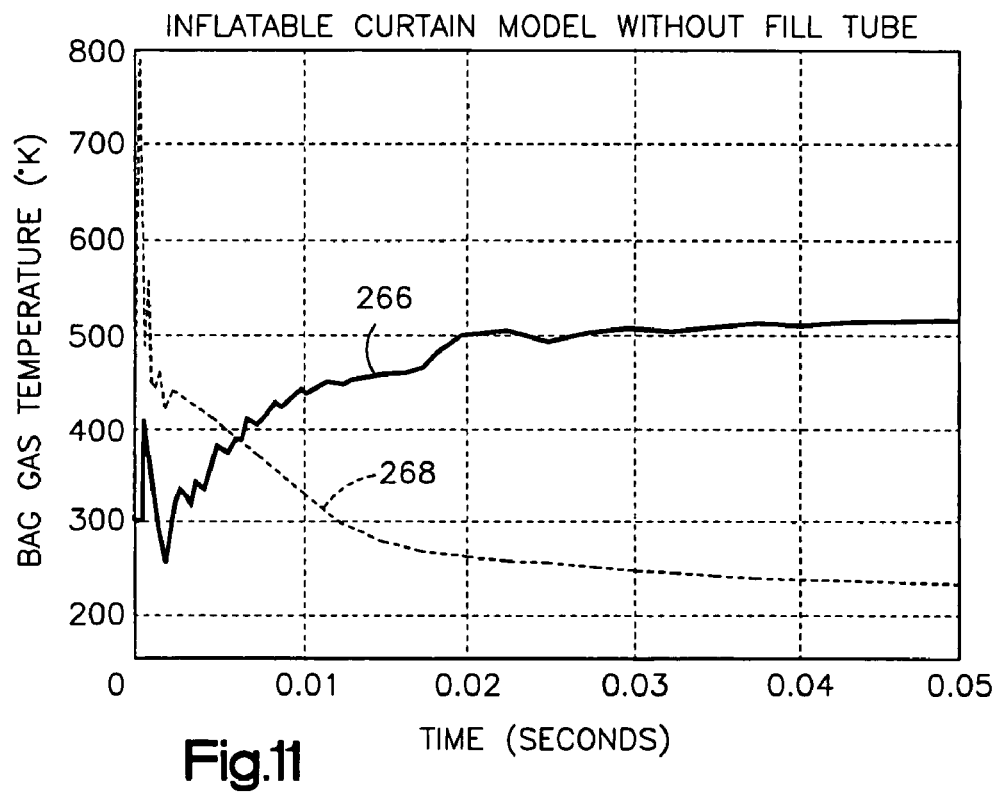

FIG. 9 illustrates a model curtain 250 modeled after an inflatable curtain construction that is known in the art. The model curtain 250 has the same characteristics as the model curtain 150 (FIG. 6), except that the fill tube 22 is omitted from the model curtain 250 (FIG. 9) and inflation fluid is directed directly into the curtain by an inflator 252. Thus, the inflation fluid passes from a rearward portion 254 of the model curtain 250 to a forward portion 260 of the curtain via passages 256 adjacent a non-inflatable area 258 of the curtain. FIGS. 10 and 11 illustrate the performance of the model curtain 250.

FIG. 10 illustrates the pressure of the inflation fluid during inflation of the model curtain 250. The solid line 262 represents the pressure in the forward portion 260 of the model curtain 250. The dashed line 264 represents the pressure in the rearward portion 254 of the model curtain 250. As shown in FIG. 10, there is a large difference, up to about 250 kilopascals, between the pressure of the inflation fluid in the forward portion 260 of the model curtain 250 and the pressure of the inflation fluid in the rearward portion 254 of the model curtain during the first 12–15 milliseconds of inflation time. Thereafter, the pressures become generally the same in the forward and rearward portions 260 and 254.

FIG. 11 illustrates the temperature of the inflation fluid versus time. The solid line 266 represents the temperature in the forward portion 260 of the model curtain 250 during inflation of the model curtain. The dashed line 268 represents the temperature in the rearward portion 254 during inflation of the model curtain. As shown in FIG. 10, there is a large initial difference between the temperature of the inflation fluid in the rearward portion 254 and the temperature of the inflation fluid in the forward portion 260. The inflation fluid in the rearward portion 254 initially jumps up to 800 degrees Kelvin and decreases down to 450 degrees Kelvin in the first two milliseconds, after which the temperature gradually slopes down to 225–275 degrees Kelvin. The inflation fluid in the forward portion 260 initially jumps up to 400 degrees Kelvin and decreases down to 260 degrees Kelvin in the first two milliseconds, after which the temperature gradually slopes upward to 450–500 degrees Kelvin. It should be noted that, after the first about 6 milliseconds of inflation, the temperature difference between the forward and rearward portions increases, and from 10 milliseconds to 50 milliseconds is at least 100 degrees Kelvin and grows to upwards of 275 degrees Kelvin.

Figure 13:
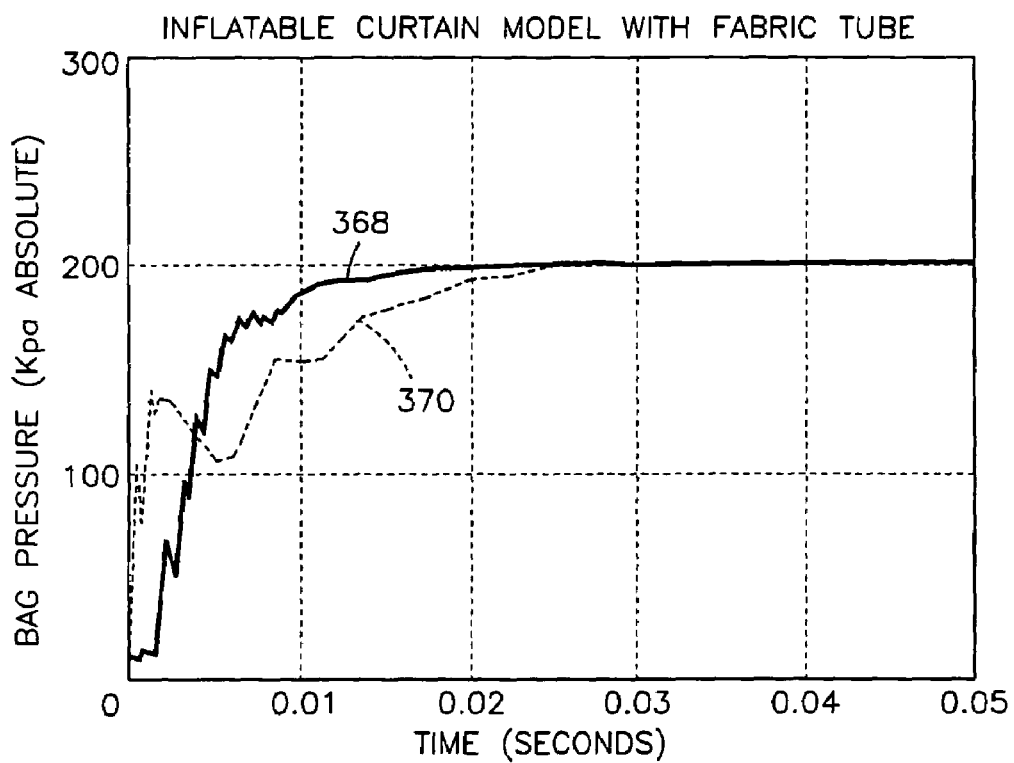
FIGS. 13–14 are graphs illustrating the performance of the model curtain of FIG. 12.
Figure 14:
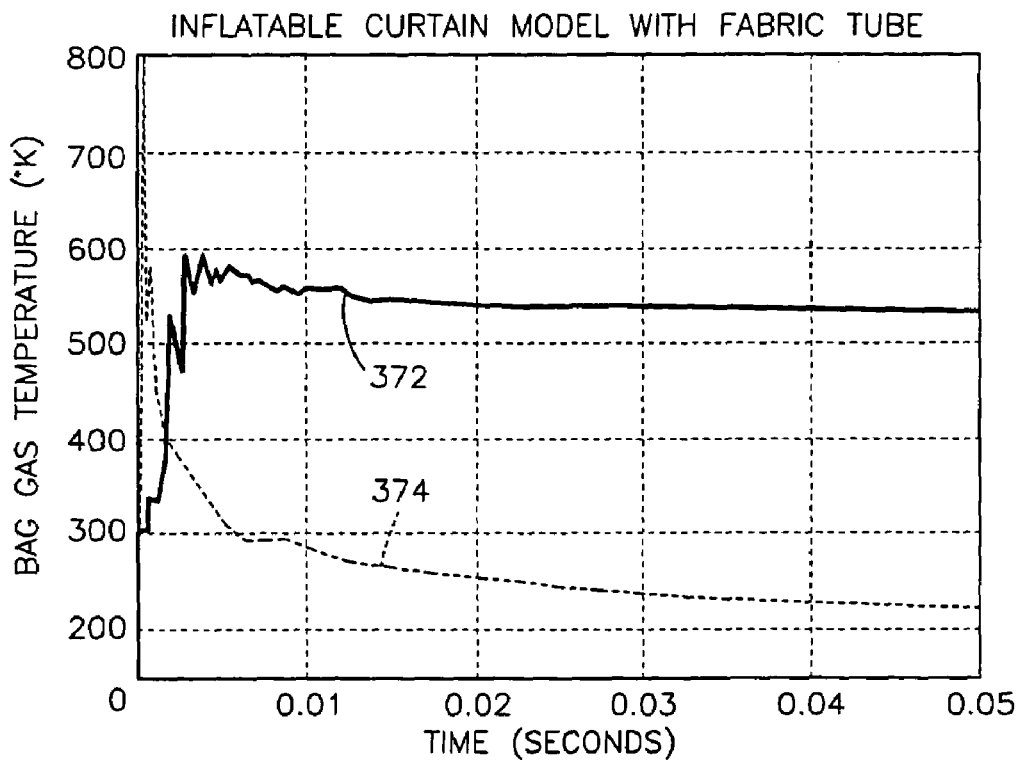

FIG. 12 illustrates a model curtain 350 modeled after another inflatable curtain construction that is known in the art. The model curtain 350 has the same characteristics as the model curtain 150 (FIG. 6), except that the fill tube 22 is omitted from the model curtain 350 (FIG. 12). Instead, inflation fluid is directed into the curtain 350 via a fabric tube 352 constructed of the curtain material and extending from the curtain to an inflator 354. The tube 352 has a diameter of about three inches. The inflation fluid flows from the inflator 354 through the tube 352 and into a rearward portion 356 of the model curtain 350. The inflation fluid then flows through passages 358 adjacent a non-inflatable area 360 of the curtain into a forward portion 362 of the curtain. FIGS. 13 and 14 illustrate the performance of the model curtain 350.

FIG. 13 illustrates the pressure of the inflation fluid during inflation of the model curtain 350. The solid line 368 represents the pressure in the forward portion 362 of the model curtain 350. The dashed line 370 represents the pressure in the rearward portion 356 of the model curtain 350. As shown in FIG. 13, the pressure of the inflation fluid in the rearward portion 356 is between about 50–75 kilopascals higher than the forward portion 362 of the model curtain 350 during the first 3–4 milliseconds of inflation time. Thereafter, the pressure is the same in the forward and rearward portions 362 and 356 for an instant, i.e., the lines 368 and 370 cross. The pressure in the forward portion 362 then becomes about 20–60 kilopascals greater than the pressure in the rearward portion 356 until about 20 milliseconds when the pressures become generally the same.

FIG. 14 illustrates the temperature of the inflation fluid during inflation of the model curtain 350. The solid line 372 represents the temperature in the forward portion 362 of the model curtain 350. The dashed line 374 represents the temperature in the rearward portion 356 of the model curtain 350. As shown in FIG. 14, there is a large initial difference between the temperature of the inflation fluid in the rearward portion 356 of the model curtain 350 and the temperature of the inflation fluid in the forward portion 362. The temperature of the inflation fluid in the rearward portion 356 initially jumps up to about 800 degrees Kelvin and decreases down to about 400 degrees Kelvin in the first two milliseconds, after which the temperature gradually slopes down to 220–280 degrees Kelvin. The temperature of the inflation fluid in the forward portion 362 initially jumps up to about 520 degrees Kelvin and decreases down to about 480 degrees Kelvin in the first three milliseconds, after which the temperature jumps up to about 575 degrees Kelvin and levels off at about 550 degrees Kelvin. It should be noted that, after the first about 2 milliseconds of inflation, the temperature difference between the forward and rearward portions 362 and 356 increases, and from 5 milliseconds to 50 milliseconds is at least 250–300 degrees Kelvin difference.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:
    an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle, said inflatable volume including a forward portion for location forwardly in the vehicle and a rearward portion for location rearwardly in the vehicle;
    an inflation fluid source that provides inflation fluid for inflating said inflatable vehicle occupant protection device, said inflation fluid consisting essentially of helium stored under pressure, said inflation fluid source being free from pyrotechnic material for heating said inflation fluid; and
    a fill tube having a portion located in said inflatable vehicle occupant protection device extending into said forward portion and said rearward portion of said inflatable volume, said fill tube being in fluid communication with said inflation fluid source, said inflation fluid source, when actuated, providing said inflation fluid to said fill tube, said fill tube including outlet apertures positioned along said portion of said fill tube for directing said inflation fluid into said inflatable volume to pressurize said forward and rearward portions evenly along the length of said inflatable vehicle occupant protection device and to inflate said inflatable vehicle occupant protection device initially to a first desired pressure and maintain said inflatable vehicle occupant protection device inflated above a second desired pressure, less than said first pressure, for at least the initial 5–7 seconds of inflation;
    said inflation fluid being directed through said outlet apertures into said forward portion and said rearward portion of said inflatable volume to inflate said forward and rearward portions, said inflation fluid directed into said forward portion and said inflation fluid directed into said rearward portion having generally the same temperature and generally the same pressure during initial inflation of said inflatable vehicle occupant protection device, said inflation fluid in said inflatable vehicle occupant protection device having a temperature about equal to an ambient temperature in which said inflatable vehicle occupant protection device is inflated for at least 95% of at least the initial 5–7 seconds of inflation.

2. Apparatus as defined in claim 1, wherein said fill tube has a predetermined number of said outlet apertures spaced a predetermined distance apart from each other along said portion of said fill tube, said predetermined number of outlet apertures and said predetermined distance being selected to provide said inflation fluid in said forward and rearward portions at generally the same pressure and temperature.

3. Apparatus as defined in claim 2, wherein said outlet apertures are arranged in groups, each of said groups including a plurality of said outlet apertures, said groups being spaced apart from each other along said portion of said fill tube.

4. Apparatus as defined in claim 3, wherein said inflatable volume is defined by a perimeter of said inflatable vehicle occupant protection device, said perimeter being at least partially defined by an upper edge and an opposite lower edge of said inflatable vehicle occupant protection device and front and rear edges spaced apart horizontally along said upper and lower edges, said upper edge extending along the side structure of the vehicle adjacent the roof of the vehicle.

5. Apparatus as defined in claim 4, wherein said fill tube has a first end connected to said inflation fluid source and an opposite second end located in said inflatable vehicle occupant protection device, said first end being positioned outside said inflatable vehicle occupant protection device near said rear edge of said inflatable vehicle occupant protection device.

6. Apparatus as defined in claim 5, wherein said outlet apertures are arranged in four groups spaced apart along said fill tube.

7. Apparatus as defined in claim 6, wherein each of said outlet apertures has a center and a diameter of about 7.0–9.0 millimeters, said outlet apertures in each of said four groups being arranged along a line and spaced along said line, said centers of adjacent apertures in each said group being spaced about 12 millimeters apart.

8. Apparatus as defined in claim 6, wherein a first group of outlet apertures includes 3 of said outlet apertures.

9. Apparatus as defined in claim 8, wherein said first group of outlet apertures is spaced about 490 millimeters from said first end of said fill tube.

10. Apparatus as defined in claim 8, wherein a second group of outlet apertures includes 5 of said outlet apertures.

11. Apparatus as defined in claim 10, wherein said second group of outlet apertures is spaced about 144 millimeters from said first group of outlet apertures.

12. Apparatus as defined in claim 10, wherein a third group of outlet apertures includes 8 of said outlet apertures.

13. Apparatus as defined in claim 12, wherein said third group of outlet apertures is spaced about 485 millimeters from said second group of outlet apertures.

14. Apparatus as defined in claim 12, wherein a fourth group of outlet apertures includes 8 of said outlet apertures.

15. Apparatus as defined in claim 14, wherein said fourth group of outlet apertures is spaced about 85 millimeters from said third group of outlet apertures.

16. Apparatus as defined in claim 2, wherein said fill tube has an outside diameter of about 15.875 millimeters and a wall thickness of about 0.71 millimeters.

17. Apparatus as defined in claim 1, wherein said inflation fluid is directed through each of said outlet apertures at a supersonic velocity.

18. Apparatus as defined in claim 17, wherein the supersonic velocity of said inflation fluid creates a shock wave that causes the temperature of said inflation fluid to increase.

19. Apparatus as defined in claim 1, wherein said inflatable vehicle occupant protection device includes a non-inflatable portion located between said forward portion and said rearward portion.

20. Apparatus as defined in claim 1, wherein said inflatable vehicle occupant protection device is an inflatable curtain having a stored position extending along the side structure adjacent a roof of the vehicle, said inflatable curtain being inflated away from the vehicle roof into said position between the side structure of the vehicle and a vehicle occupant.

21. Apparatus as defined in claim 20, wherein said inflatable curtain when inflated extends along the side structure of the vehicle between an A pillar and a C pillar of the vehicle.

22. Apparatus as defined in claim 20, wherein said inflatable curtain, when inflated, overlies at least a portion of an A pillar, a B pillar and a C pillar of the vehicle.

23. Apparatus as defined in claim 1, further comprising a sensor for sensing a vehicle condition for which deployment of said inflatable vehicle occupant protection device is desired, said sensor actuating said inflation fluid source to provide inflation fluid to inflate said inflatable vehicle occupant protection device.

24. Apparatus as defined in claim 1, wherein said inflation fluid source comprises an inflator which is actuatable to inflate said inflatable vehicle occupant protection device.

25. Apparatus as defined in claim 24, wherein said inflator is a stored gas inflator, said inflation fluid being compressed and stored at about 6250 psig.

26. Apparatus as defined in claim 1, wherein said fill tube directs said inflation fluid into said inflatable vehicle occupant protection device at generally the same temperature and pressure throughout at least the initial 5–7 seconds of inflation.

27. Apparatus as defined in claim 26, wherein said inflation fluid inflates said inflatable vehicle occupant protection device evenly along the length of said inflatable vehicle occupant protection device.

28. Apparatus as defined in claim 27, wherein said outlet apertures are positioned and spaced to cause said inflatable vehicle occupant protection device to inflate evenly along the length of said inflatable vehicle occupant protection device.

29. Apparatus as defined in claim 1, wherein said generally the same temperature is just above said ambient temperature in which said inflatable vehicle occupant protection device is inflated.

30. Apparatus as defined in claim 1, wherein said fill tube contains a volume of air prior to actuation of said inflation fluid source, said fill tube being constructed such that said volume of air undergoes adiabatic compressive heating in said fill tube upon actuation of said inflation fluid source, said inflation fluid gaining heat from said volume of air.

31. Apparatus as defined in claim 30, wherein said inflation fluid gains heat thermodynamically from said fill tube.

32. Apparatus as defined in claim 1, wherein said generally the same temperature is about equal to said ambient temperature for at least 98% of at least the initial 5–7 seconds of inflation.

33. Apparatus as defined in claim 1, wherein said first predetermined pressure is about 149–163 kilopascals absolute.

34. Apparatus as defined in claim 1, wherein said second predetermined pressure is about 125 kilopascals absolute.

35. Apparatus for helping to protect an occupant of a vehicle that has a side structure and a roof, said apparatus comprising:
   an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle;
   an inflation fluid source that provides inflation fluid for inflating said inflatable vehicle occupant protection device, said inflation fluid consisting essentially of helium stored under pressure, said inflation fluid source being free from pyrotechnic material for heating said inflation fluid; and
   a fill tube having a portion located in said inflatable vehicle occupant protection device extending into said inflatable volume, said fill tube being in fluid communication with said inflation fluid source, said inflation fluid source, when actuated, providing said inflation fluid to said fill tube, said fill tube including outlet apertures positioned along said portion of said fill tube for directing said inflation fluid into said inflatable volume to pressurize said inflatable volume evenly along the length of said inflatable vehicle occupant protection device and to inflate said inflatable vehicle occupant protection device initially to a first desired pressure and maintain said inflatable vehicle occupant protection device inflated above a second desired pressure, less than said first desired pressure, for at least the initial 5–7 seconds of inflation;
   said inflation fluid being directed through said outlet apertures into said inflatable volume to inflate said inflatable volume, said inflation fluid directed into said inflatable volume having a temperature that is generally the same and a pressure that is generally the same throughout the length of said inflatable vehicle occupant protection device during initial inflation of said inflatable vehicle occupant protection device, said inflation fluid in said inflatable vehicle occupant protection device having a temperature about equal to an ambient temperature in which said inflatable vehicle occupant protection device is inflated for at least 95% of at least the initial 5–7 seconds of inflation.

36. Apparatus as defined in claim 35, wherein said fill tube has a predetermined number of said outlet apertures spaced a predetermined distance apart from each other along said portion of said fill tube, said predetermined number of outlet apertures and said predetermined distance being selected to provide said inflation fluid in said forward and rearward portions at generally the same pressure and temperature.

37. Apparatus as defined in claim 35, wherein said fill tube directs said inflation fluid into said inflatable vehicle occupant protection device at generally the same temperature and pressure throughout at least the initial 5–7 seconds of inflation.

38. Apparatus as defined in claim 37, wherein said inflation fluid inflates said inflatable vehicle occupant protection device evenly along the length of said inflatable vehicle occupant protection device.

39. Apparatus as defined in claim 38, wherein said outlet apertures are positioned and spaced to cause said inflatable vehicle occupant protection device to inflate evenly along the length of said inflatable vehicle occupant protection device.

40. Apparatus as defined in claim 35, wherein said generally the same temperature is just above said ambient temperature in which said inflatable vehicle occupant protection device is inflated.

41. Apparatus as defined in claim 35, wherein said generally the same temperature is about equal to said ambient temperature for at least 98% of at least the initial 5–7 seconds of inflation.

42. A method for helping to protect an occupant of a vehicle that has a side structure and a roof, said method comprising the steps of:
providing an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle, said inflatable volume including a forward portion for location forwardly in the vehicle and a rearward portion for location rearwardly in the vehicle;
providing an inflation fluid source that provides inflation fluid for inflating said inflatable vehicle occupant protection device, said inflation fluid source, when actuated, providing said inflation fluid to inflate said inflatable vehicle occupant protection device initially to a first desired pressure and maintain said inflatable vehicle occupant protection device inflated above a second desired pressure, less than said first pressure, for at least the initial 5–7 seconds of inflation, said inflation fluid consisting essentially of helium stored under pressure, said inflation fluid source being free from pyrotechnic material for heating said inflation fluid; and
providing a fill tube for directing said inflation fluid into said forward portion and said rearward portion of said inflatable volume to pressurize said forward and rearward portions evenly along the length of said inflatable vehicle occupant protection device, said inflation fluid directed into said forward portion and said inflation fluid directed into said rearward portion having a temperature that is generally the same and a pressure that is generally the same during initial inflation of said inflatable vehicle occupant protection device to cause said inflatable vehicle occupant protection device to inflate evenly throughout the length of said inflatable vehicle occupant protection device, said inflation fluid directed into said inflatable vehicle occupant protection device having a temperature about equal to an ambient temperature in which said inflatable vehicle occupant protection device is inflated for at least 95% of at least the initial 5–7 seconds of inflation.

43. The method of claim 42, further comprising the steps of providing said fill tube having a predetermined cross-sectional flow area and a predetermined number of said outlet apertures spaced a predetermined distance apart from each other along said portion of said fill tube, said predetermined cross-sectional flow area, said predetermined number of outlet apertures, and said predetermined distance being selected to provide said inflation fluid in said forward and rearward portions at generally the same pressure and temperature.

44. The method of claim 43, further comprising the steps of arranging said outlet apertures in groups that include a plurality of said outlet apertures and spacing said groups apart from each other along said portion of said fill tube.

45. The method of claim 44, further comprising the steps of creating a computer-generated model to select said predetermined number of said outlet apertures and said predetermined spacing of said outlet apertures.

46. The method of claim 45, wherein said step of creating a computer-generated model comprises creating a two-dimensional computational fluid dynamics model.

47. Apparatus for helping to protect an occupant of a vehicle that has a side structure and a roof, said apparatus comprising:
an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle;
an inflation fluid source for providing inflation fluid to inflate said inflatable vehicle occupant protection device, said inflation fluid consisting essentially of helium stored under pressure, said inflation fluid source being free from pyrotechnic material for heating said inflation fluid; and
a fill tube having a portion located in said inflatable vehicle occupant protection device, said fill tube being in fluid communication with said inflation fluid source, said inflation fluid source, when actuated, providing said inflation fluid to said fill tube, said fill tube directing said inflation fluid into said inflatable volume to pressurize said inflatable vehicle occupant protection device evenly along its length and to inflate said inflatable vehicle occupant protection device initially to a first desired pressure and maintain said inflatable vehicle occupant protection device inflated above a second desired pressure, less than said first pressure, for at least the initial 5–7 seconds of inflation, said fill tube being adapted to deliver said inflation fluid into said inflatable volume such that said inflation fluid directed into said inflatable vehicle occupant protection device has a temperature about just above an ambient temperature in which said inflatable vehicle occupant protection device is inflated.

48. Apparatus as defined in claim 47, wherein said fill tube is adapted to deliver said inflation fluid in said inflatable volume at said temperature about just above said ambient temperature generally equally throughout the length of said inflatable vehicle occupant protection device during initial inflation of said inflatable vehicle occupant protection device.

49. Apparatus as defined in claim 48, wherein said fill tube is adapted to deliver said inflation fluid into said inflatable volume at generally the same pressure along the length of said inflatable vehicle occupant protection device during initial inflation of said inflatable vehicle occupant protection device to cause said inflatable vehicle occupant protection device to inflate evenly along the length of said inflatable vehicle occupant protection device.

50. Apparatus for helping to protect an occupant of a vehicle that has a side structure and a roof, said apparatus comprising:
an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle, said inflatable volume including a forward portion for location forwardly in the vehicle and a rearward portion for location rearwardly in the vehicle;
an inflation fluid source that provides inflation fluid for inflating said inflatable vehicle occupant protection device, said inflation fluid consisting essentially of helium stored under pressure; and
means for directing said inflation fluid into said inflatable volume to inflate said inflatable vehicle occupant protection device initially to a first desired pressure and maintain said inflatable vehicle occupant protection device inflated above a second desired pressure, less than said first desired pressure, for at least the initial 5–7 seconds of inflation, said means being for directing said inflation fluid into said forward portion and said rearward portion of said inflatable volume to inflate said forward and rearward portions, said means also being for directing said inflation fluid into said forward portion and into said rearward portion at generally the same temperature and generally the same pressure during initial inflation of said inflatable vehicle occupant protection device, said inflation fluid in said inflatable vehicle occupant protection device having a temperature about equal to an ambient temperature in which said inflatable vehicle occupant protection device is inflated for at least 95% of the at least 5–7 seconds of inflation;
said means for directing comprising a fill tube having a portion located in said inflatable vehicle occupant protection device extending into said forward portion and said rearward portion of said inflatable volume, said fill tube being in fluid communication with said inflation fluid source, said inflation fluid source, when actuated, providing said inflation fluid to said fill tube, said fill tube including outlet apertures positioned along said portion of said fill tube through which said inflation fluid is directed into said forward and rearward portions of said inflatable volume to pressurize said forward and rearward portions evenly along the length of said inflatable vehicle occupant protection device and.

51. Apparatus for helping to protect an occupant of a vehicle that has a side structure, said apparatus comprising:
an inflatable side curtain having a length extending along the vehicle side structure;
a stored helium inflator for providing helium inflation fluid for inflating said side curtain, said inflator being free from pyrotechnic material for heating said helium inflation fluid; and
a fill tube for directing said helium inflation fluid into said side curtain to inflate said side curtain, said fill tube being for distributing said helium inflation fluid evenly along the length of said side curtain to cause pressurization of said side curtain evenly along its length and maintain said pressurization for at least 5 seconds, said fill tube also being for heating said helium inflation fluid so that the helium in said side curtain has a temperature about equal to an ambient temperature in which said side curtain is deployed for at least 95% of said at least 5 seconds.

52. Apparatus for helping to protect an occupant of a vehicle that has a side structure and a roof, said apparatus comprising:
an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle, said inflatable volume including a forward portion for location forwardly in the vehicle and a rearward portion for location rearwardly in the vehicle;
an inflation fluid source that provides inflation fluid for inflating said inflatable vehicle occupant protection device, said inflation fluid consisting essentially of helium stored under pressure, said inflation fluid source being free from pyrotechnic material for heating said inflation fluid; and
a fill tube having a portion located in said inflatable vehicle occupant protection device extending into said forward portion and said rearward portion of said inflatable volume, said fill tube being in fluid communication with said inflation fluid source, said inflation fluid source, when actuated, providing said inflation fluid to said fill tube, said fill tube including outlet apertures arranged in groups that are spaced apart from each other along said portion of said fill tube, the number of said outlet apertures in each of said groups and the spacing of said groups along said fill tube being selected to direct said inflation fluid into said inflatable volume to inflate said forward and rearward portions to generally the same pressure during initial inflation of said inflatable vehicle occupant protection device and to inflate said inflatable vehicle occupant protection device initially to a first desired pressure and maintain said inflatable vehicle occupant protection device inflated above a second desired pressure, less than said first pressure, for at least the initial 5–7 seconds of inflation;
said inflation fluid being directed through said outlet apertures into said forward portion and said rearward portion of said inflatable volume to inflate said forward and rearward portions at generally the same temperature during initial inflation of said inflatable vehicle occupant protection device for at least 95% of at least the initial 5–7 seconds of inflation, said temperature about equal to an ambient temperature in which said inflatable vehicle occupant protection device is inflated.

53. Apparatus for helping to protect an occupant of a vehicle that has a side structure and a roof, said apparatus comprising:

an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle, said inflatable volume including a forward portion for location forwardly in the vehicle, a rearward portion for location rearwardly in the vehicle, and a non-inflatable portion located between said forward portion and said rearward portion;

an inflation fluid source that provides inflation fluid for inflating said inflatable vehicle occupant protection device, said inflation fluid consisting essentially of helium stored under pressure, said inflation fluid source being free from pyrotechnic material for heating said inflation fluid; and a fill tube having a portion located in said inflatable vehicle occupant protection device extending into said forward portion and said rearward portion of said inflatable volume, said fill tube being in fluid communication with said inflation fluid source, said inflation fluid source, when actuated, providing said inflation fluid to said fill tube, said fill tube including outlet apertures positioned along said portion of said fill tube for directing said inflation fluid into said inflatable volume to inflate said inflatable vehicle occupant protection device initially to a first desired pressure and maintain said inflatable vehicle occupant protection device inflated above a second desired pressure, less than said first pressure, for at least the initial 5–7 seconds of inflation;

said inflation fluid being directed through said outlet apertures into said forward portion and said rearward portion of said inflatable volume to inflate said forward and rearward portions, said inflation fluid directed into said forward portion and said inflation fluid directed into said rearward portion having generally the same temperature and generally the same pressure during initial inflation of said inflatable vehicle occupant protection device, said inflation fluid in said inflatable vehicle occupant protection device having a temperature about equal to an ambient temperature in which said inflatable vehicle occupant protection device is inflated for at least 95% of at least the initial 5–7 seconds of inflation.

54. A method for helping to protect an occupant of a vehicle that has a side structure and a roof, said method comprising the steps of:

providing an inflatable vehicle occupant protection device that is inflatable away from the vehicle roof into a position between the side structure of the vehicle and a vehicle occupant, said inflatable vehicle occupant protection device defining an inflatable volume and having a length extending along the side structure of the vehicle, said inflatable volume including a forward portion for location forwardly in the vehicle and a rearward portion for location rearwardly in the vehicle;

providing an inflation fluid source that provides inflation fluid for inflating said inflatable vehicle occupant protection device, said inflation fluid consisting essentially of helium stored under pressure, said inflation fluid source being free from pyrotechnic material for heating said inflation fluid;

providing a fill tube for directing said inflation fluid from said inflation fluid source into said forward portion and said rearward portion of said inflatable volume; and providing in said fill tube a predetermined number of outlet apertures arranged in groups, the number of said apertures in each of said groups and the spacing of said groups along the length of said fill tube being selected to inflate said forward and rearward portions initially to a first desired pressure and maintain said front and rear portions inflated above a second desired pressure, less than said first pressure, for at least the initial 5–7 seconds of inflation, said outlet apertures directing said inflation fluid into said inflatable vehicle occupant protection device at a temperature about equal to an ambient temperature in which said inflatable vehicle occupant protection device is inflated for at least 95% of at least the initial 5–7 seconds of inflation.

55. Apparatus for helping to protect an occupant of a vehicle that has a side structure, said apparatus comprising:

an inflatable side curtain having a length extending along the vehicle side structure;

a stored helium inflator for providing helium inflation fluid for inflating said side curtain, said inflator being free from pyrotechnic material for heating said helium inflation fluid; and a fill tube for directing said helium inflation fluid into said side curtain to inflate said side curtain, said fill tube including outlet apertures arranged in groups that are spaced apart from each other along said portion of said fill tube, the number of said outlet apertures in each of said groups and the spacing of said groups along said fill tube being selected to distribute said helium inflation fluid evenly along the length of said side curtain to cause pressurization of said side curtain evenly along its length and maintain said pressurization for at least 5 seconds, said fill tube heating said helium inflation fluid so that the helium in said side curtain has a temperature about equal to an ambient temperature in which said side curtain is deployed for at least 95% of said at least 5 seconds.

56. Apparatus for helping to protect an occupant of a vehicle that has a side structure, said apparatus comprising:

an inflatable side curtain having a length extending along the vehicle side structure, said side curtain including a forward portion for location forwardly in the vehicle, a rearward portion for location rearwardly in the vehicle, and a non-inflatable portion located between said forward portion and said rearward portion;

a stored helium inflator for providing helium inflation fluid for inflating said side curtain, said inflator being free from pyrotechnic material for heating said helium inflation fluid; and a fill tube for directing said helium inflation fluid into said side curtain to inflate said side curtain, said fill tube being for distributing said helium inflation fluid evenly along the length of said side curtain to cause pressurization of said side curtain evenly along its length and maintain said pressurization for at least 5 seconds, said fill tube also being for heating said helium inflation fluid so that the helium in said side curtain has a temperature about equal to an ambient temperature in which said side curtain is deployed for at least 95% of said at least 5 seconds.

57. Apparatus as defined in claim 1, wherein said inflatable vehicle occupant protection device is inflated initially to said first desired pressure within about 20–30 milliseconds.

* * * * *